United States Patent
Tran

(10) Patent No.: US 8,385,188 B2
(45) Date of Patent: Feb. 26, 2013

(54) MULTI-PORT, GIGABIT SERDES TRANSCEIVER CAPABLE OF AUTOMATIC FAIL SWITCHOVER

(75) Inventor: Hoang Tran, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 1527 days.

(21) Appl. No.: 11/117,470

(22) Filed: Apr. 29, 2005

(65) Prior Publication Data

US 2005/0190690 A1    Sep. 1, 2005

Related U.S. Application Data

(63) Continuation-in-part of application No. 10/694,788, filed on Oct. 29, 2003, now Pat. No. 7,035,228.

(60) Provisional application No. 60/421,780, filed on Oct. 29, 2002.

(51) Int. Cl.
   G06F 11/00    (2006.01)
(52) U.S. Cl. .......................... 370/216; 370/242
(58) Field of Classification Search .......................... None
   See application file for complete search history.

(56) References Cited

U.S. PATENT DOCUMENTS

| | | | |
|---|---|---|---|
| 4,451,916 A * | 5/1984 | Casper et al. ...................... 714/4 |
| 4,627,070 A | 12/1986 | Champlin et al. |
| 4,773,081 A * | 9/1988 | Morimoto ...................... 375/267 |
| 4,833,605 A | 5/1989 | Terada et al. |
| 4,833,695 A | 5/1989 | Greub |
| 4,967,201 A | 10/1990 | Rich, III |
| 5,329,520 A * | 7/1994 | Richardson ...................... 370/225 |
| 5,726,991 A | 3/1998 | Chen et al. |
| 5,793,990 A | 8/1998 | Jirgal et al. |
| 5,835,496 A * | 11/1998 | Yeung et al. ...................... 370/514 |
| 5,933,021 A | 8/1999 | Mohd |
| 6,081,570 A | 6/2000 | Ghuman et al. |
| 6,137,734 A | 10/2000 | Schoner et al. |
| 6,140,956 A | 10/2000 | Hillman et al. |
| 6,167,026 A * | 12/2000 | Brewer et al. ...................... 370/222 |
| 6,259,693 B1 * | 7/2001 | Ganmukhi et al. ...................... 370/366 |
| 6,317,804 B1 | 11/2001 | Levy et al. |
| 6,438,717 B1 | 8/2002 | Butler et al. |
| 6,483,849 B1 | 11/2002 | Bray et al. |
| 6,895,528 B2 * | 5/2005 | Cantwell et al. ...................... 714/12 |
| 7,032,139 B1 * | 4/2006 | Iryami et al. ...................... 714/704 |
| 7,035,228 B2 | 4/2006 | Baumer |
| 7,221,652 B1 * | 5/2007 | Singh et al. ...................... 370/242 |

(Continued)

OTHER PUBLICATIONS

International Search Report issued Dec. 14, 2004 for International Application No. PCT/US03/34234, 4 pages.

(Continued)

*Primary Examiner* — Nittaya Juntima
*Assistant Examiner* — Rhonda Murphy
(74) *Attorney, Agent, or Firm* — Sterne, Kessler, Goldstein & Fox P.L.L.C.

(57) ABSTRACT

A multi-port Serdes transceiver includes multiple parallel ports and serial ports, and includes the flexibility to connect any of the parallel ports to another parallel port or to a serial port, or both. Furthermore, the transceiver can connect any of the serial ports to another serial port or to a parallel port. The transceiver further includes a switch, a logic core, and a bus. The switch is selectively coupled to at least a first port and a second port. The switch activates the first port and deactivates the second port based on satisfaction of a condition associated with the first port. The logic core operates the serial and parallel ports, and the bus connects the ports. The bus can be described as a "ring" structure (or donut "structure") around the logic core, and is configured between the logic core and the ports. The ring structure provides efficient communication between the logic core and the ports.

34 Claims, 23 Drawing Sheets

U.S. PATENT DOCUMENTS

| | | |
|---|---|---|
| 2001/0012288 A1 | 8/2001 | Yu |
| 2001/0015664 A1 | 8/2001 | Taniguchi |
| 2001/0017595 A1 | 8/2001 | Cliff et al. |
| 2001/0021953 A1 | 9/2001 | Nakashima |
| 2002/0054569 A1 | 5/2002 | Morkawa |
| 2003/0009307 A1 | 1/2003 | Mejia et al. |
| 2003/0048781 A1 | 3/2003 | Peirson |
| 2003/0120791 A1 | 6/2003 | Weber et al. |
| 2003/0172332 A1 | 9/2003 | Rearick et al. |
| 2004/0083077 A1 | 4/2004 | Baumer et al. |
| 2004/0088443 A1 | 5/2004 | Tran et al. |
| 2004/0117698 A1 | 6/2004 | Tran et al. |
| 2004/0141497 A1 | 7/2004 | Amirichimeh et al. |
| 2004/0141531 A1 | 7/2004 | Amirichimeh et al. |
| 2006/0250985 A1 | 11/2006 | Baumer |

OTHER PUBLICATIONS

Cisco Systems, Hiroshi Suzuki: Taking Ethernet Beyond the LAN, http://newsroom.cisco.com/dlls/innovators/optical/hiroshi_suzuki_profile.html.

Cisco Systems, Q&A: Hiroshi Suzuki on Extending Ethernet Beyond the LAN, http://newsroom.cisco.com/dlls/innovators/optical/hiroshi_suzuki_qa.html.

Cisco Systems, Innovator Profiles, http://newsroom.cisco.com/dlls/innovators/inn_profiles.html.

Cisco Systems, Optical, http://newsroom.cisco.com/dlls/innovators/optical/.

Cisco Systems, Cisco Systems and Aretae Interactive Launch Internet Powered Property (IP2), http://newsroom.cisco.com/dlls/global/asiapac/news/2000/pr_07-25.html.

Alaska Quad-Port Gigabit Ethernet Over Copper Transceivers, from http://www.marvell.com/products/transceivers/quadport/ . . . , 1 page, printed May 8, 2007.

Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry, from http://www.nuhorizons.com/FeaturedProducts/Volume3/Marvell/phy_transceiver.asp, 4 pages, Copyright 2007, printed May 8, 2007.

Cisco Search: Results for "cdl" within "News@Cisco", from http://www.cisco.com/pcgi-bin/search/search.pl, Copyright 1992-2003, printed Jul. 29, 2003.

Industry Breakthrough: Marvell Announces the First Quad-Port Transceiver to Support Both Copper and Fiber-Optic Gigabit Ethernet Interfaces, from Business Wire at www.encyclopedia.com/printable/aspx?id=1G1:68912211, 4 pages, Jan. 9, 2001, printed May 8, 2007.

David Maliniak (ed.), Bel's integrated connector modules support Marvell's Alaska quad Gigabit Ethernet transceiver, from http://www.electronicsweb.com/Content/news/ . . . , 1 page, Dec. 14, 2000, printed May 8, 2007.

Marvell Gets Small, from http://www.lightreading.com/document.asp?doc_id=12004&print—true, 1 page, Feb. 19, 2002, printed May 8, 2007.

Marvell Introduces the Industry's Smallest Quad-Port Gigabit Transceiver Device, Enabling Ultra High Port Density Enterprise Switching Systems, from http://www.marvell.com/press/press NewsDisplay.do?releaseID-41, 3 pages, Feb. 19, 2002, printed May 8, 2007.

Ed Turner, David Law, Sep. 17-19, 2001, "IEEE P802.3ae MDC/MDIO", http://www.leee802.org/3/efm/public/sep01/turner.sub.--1.sub.--0901.pdf.

Q&A: Hiroshi Suzuki on Extending Ethernet Beyond the LAN, from http://newsroom.cisco.com/dlls/innovators/optical/hiroshi_suzuki_qa.html, 3 pages, Copyright 1992-2003, printed Jul. 29, 2003.

IEEE Std. 802.3, Part 3: Carrier Sense Multiple Access with Collision Detection (CSMA/CD) access method and physical layer specifications, Section Two, pp. 9-55, Copyright 2002.

IEEE Std. 802.3, Part 3: Carrier Sense Multiple Access with Collision Detection (CSMA/CD) access method and physical layer specifications, Section Four, pp. 9-152, Copyright 2005.

"Broadcom Announces the First 0.13-micron CMOS Multi-Rate Gigabit Octal Serializers/Deserializers" [online], Broadcom Press Release, Oct. 29, 2002 [retrieved on Jul. 16, 2003]. Retrieved from the Internet: <URL: http://www.broadcom.com/cgi-bin/pr/prps.cgi?pr_id=PRO21029> (5 pages).

BCM8040 8-Channel Multi-rate 1.0-3.2-GBPS Retimer Switch [online], Broadcom Products Site Guide [retrieved on Jul. 16, 2003]. Retrieved from the Internet: <URL: http://www.broadcom.com/products/8040.html> (2 pages).

8-Channel Multi-Rate CMOS Retimer with Full Redundancy [online], BCM8040 Product Brief, Broadcom Corporation (2002) [retrieved on Jul. 16, 2003]. Retrieved from the Internet<URL: http://www.broadcom.com/products/8040.html> (2 pages).

BCM8020 8-Channel Multi-rate 1.0-3.2-GBPS Transceiver [online], Broadcom Products Site Guide [retrieved on Jul. 16, 2003]. Retrieved from the Internet: <URL: http://www.broadcom.com/products/8020.html> (2 pages).

8-Channel Multi-Rate CMOS Transceiver with Full Redundancy [online], BCM8020 Product Brief, Broadcom Corporation (2002) [retrieved on Jul. 16, 2003]. Retrieved from the Internet: <URL: http://www.broadcom.com/products/8020.html> (2 pages).

BCM8021 4-Channel Multi-rate 1.0-3.2-GBPS Transceiver with High-Speed Redundancy [online], Broadcom Products Site Guide [retrieved on Jul. 16, 2003]. Retrieved from the Internet: <URL: http://www.broadcom.com/products/8021.html> (2 pages).

4-Channel Multirate 1.0-3.2-GBPS Transceiver with High-Speed Redundancy [online], BCM8021 Product Brief, Broadcom Corporation (2002) [retrieved on Jul. 16, 2003]. Retrieved from the Internet: <URL: http://www.broadcom.com/products/8021.html> (2 pages).

Broadcom Announces the Industry's First 0.13-micron CMOS Advanced Transciver Solution with Signal Conditioning for Low-Cost 10-Gigabit Over Copper Links [online], Broadcom Press Release, Apr. 29, 2003 [retrieved on Jul. 16, 2003]. Retrieved from the Internet: <URL: http://www.broadcom.com/cgi-bin/pr/prps.cgi?pr_id=PR030429A> (4 pages).

* cited by examiner

MULTI-PORT, GIGABIT SERDES TRANSCEIVER CAPABLE OF AUTOMATIC FAIL SWITCHOVER

CROSS-REFERENCED TO RELATED APPLICATIONS

This application is a continuation-in-part of U.S. patent application Ser. No. 10/694,788, filed on Oct. 29, 2003, now U.S. Pat. No. 7,035,228, which claims the benefit of U.S. Provisional Application No. 60/421,780, filed on Oct. 29, 2002, both of which are incorporated herein by reference in their entireties.

BACKGROUND OF THE INVENTION

1. Field of the Invention

The present invention generally relates to serializer/deserializer integrated circuits with multiple high speed data ports, and more particularly to a serial and de-serializer chip that includes the functionality to switch between multiple high speed data ports.

2. Background Art

High speed data links transmit data from one location to another over transmission lines. These data links can include serializer data links that receive data in a parallel format and convert the data to a serial format for high speed transmission and deserializer data links that receive data in serial format and convert the data to a parallel format. Data links that include serializer and deserializer functionality are referred to as serializer/deserializer data links (i.e., SERDES). SERDES data links can be part of a backplane in a communications system (e.g., Tyco Backplane 30-inch trace).

In a high speed back plane configuration, it is often desirable to switch between multiple Serdes links. In other words, it is often desirable to switch between any one of multiple Serdes links to another Serdes link, and to do so in a low power configuration on a single integrated circuit.

BRIEF SUMMARY OF THE INVENTION

A multi-port Serdes transceiver includes multiple parallel ports and serial ports, and includes the flexibility to connect any one of the parallel ports to another parallel port or to a serial port, or both. Furthermore, the multi-port transceiver chip can connect any one of the serial ports to another serial port or to one of the parallel ports. The multi-port Serdes transceiver is able to operate at multiple data rates.

The Serdes transceiver includes configuration logic that is capable of activating and/or deactivating ports in the transceiver. The configuration logic can detect that a first port is active and determine whether to deactivate the first port based on whether a failure is detected. If the first port is deactivated, a second port is activated to take over operations associated with the first port. Specific functions can be deactivated with respect to a port. For example, transmitting functions of a port can be deactivated while the receiving functions remain activated, or vice versa.

The multi-port Serdes transceiver also includes a packet bit error rate tester (BERT). The packet BERT generates and processes packet test data that can be transmitted over any of the serial ports to perform bit error testing. The packet BERT can monitor (or "snoop") between the serial ports. In other words, if data is being transmitted from one serial port to another serial port, the packet BERT can capture and store a portion of this data for bit error testing.

The substrate layout of the multi-port Serdes transceiver chip is configured so that the parallel ports and the serial ports are on the outer perimeter of the substrate. A logic core is at the center of the substrate, where the logic core operates the serial and parallel data ports, and a bus that connects the data ports. The bus can be described as a "ring" structure (or donut "structure") around the logic core, and is configured between the logic core and the data ports. The ring structure of the bus provides efficient communication between the logic core and the various data ports.

The Serdes transceiver described herein is highly flexible and can be configured to provide multiple different transceiver products from enabling and disabling various serial and parallel data ports. This is accomplished using a configuration logic circuit that enables/disables these data ports. As a result, several different transceiver products, with different capabilities and price points, can be configured from a single semiconductor die.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
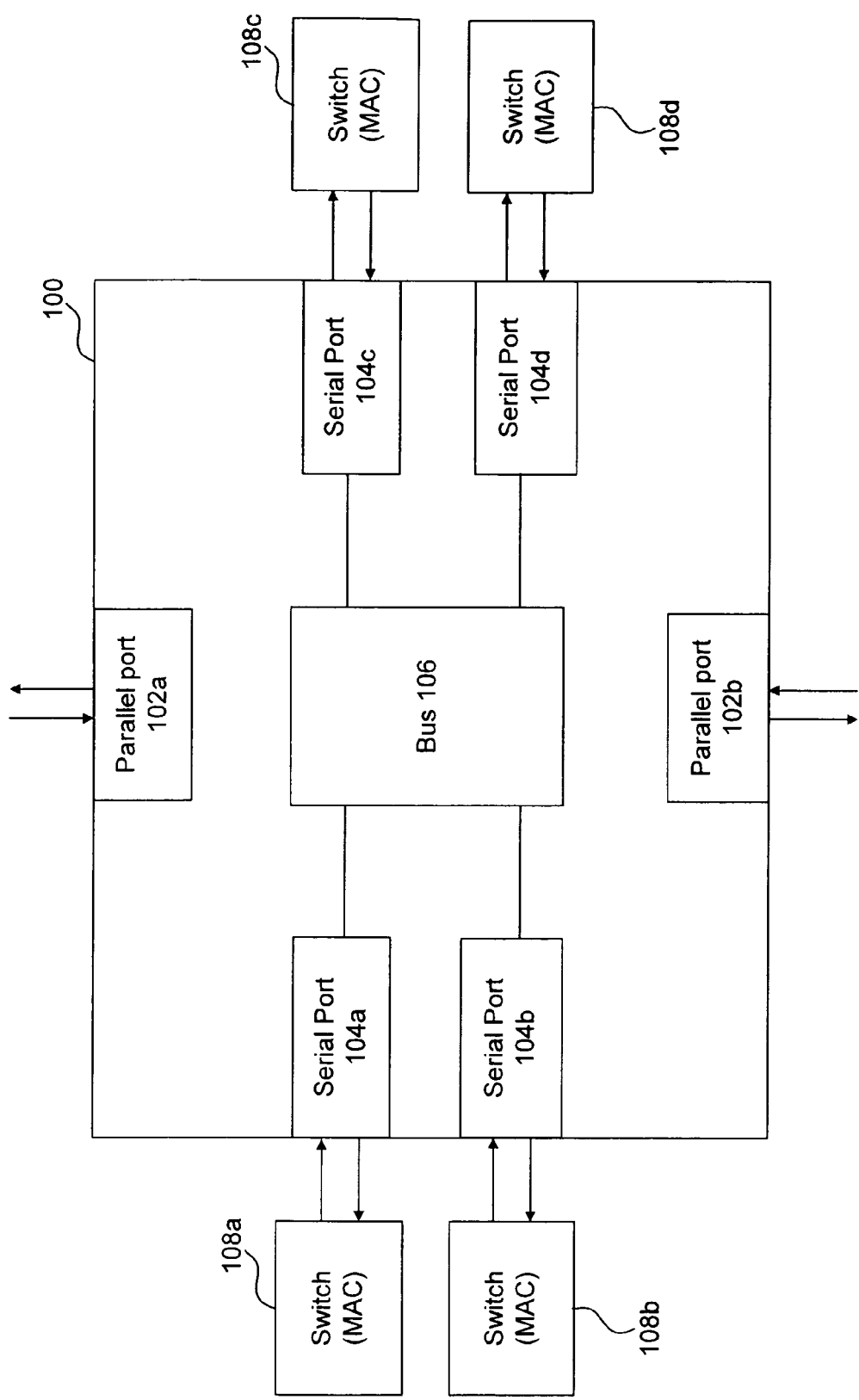
FIG. 1 illustrates a multi-port Serdes chip according to embodiments of the present invention.

FIG. 1 illustrates a multi-port transceiver 100 according to embodiments of the present invention. Transceiver 100 includes a plurality of serial ports 104*a-d*, a plurality of parallel ports 102*a-b*, and a bus 106. Each of the plurality of serial ports 104 is capable of transmitting and receiving data in a serial format, and each of the parallel ports 102 is capable of transmitting and receiving data in a parallel format. For example, the serial ports 104 could be transmitting and receiving serial data with corresponding switches (e.g. MACs) 108*a-d*.

The transceiver 100 also includes a bus 106 that is coupled to the serial ports 104*a-d* and the parallel ports 102*a* and 102*b*. The bus 106 enables any serial port 104 to be connected to any other serial port 104 and to any parallel port 102 for data transmission, and vice versa. Therefore, data can be transmitted from any switch 108 to any other switch 108, or can be transmitted and received to and from the parallel ports 102. For example, data received at the serial port 104*a* from switch 108*a* can be routed to the serial port 104*c* by the bus 106, for transmission to the switch 108*c*. Additionally, data from the switch 108*a* can be routed to the other serial ports 104*b-d* and to the parallel ports 102*a* and 102*b* through the bus 106.

Figure 2:
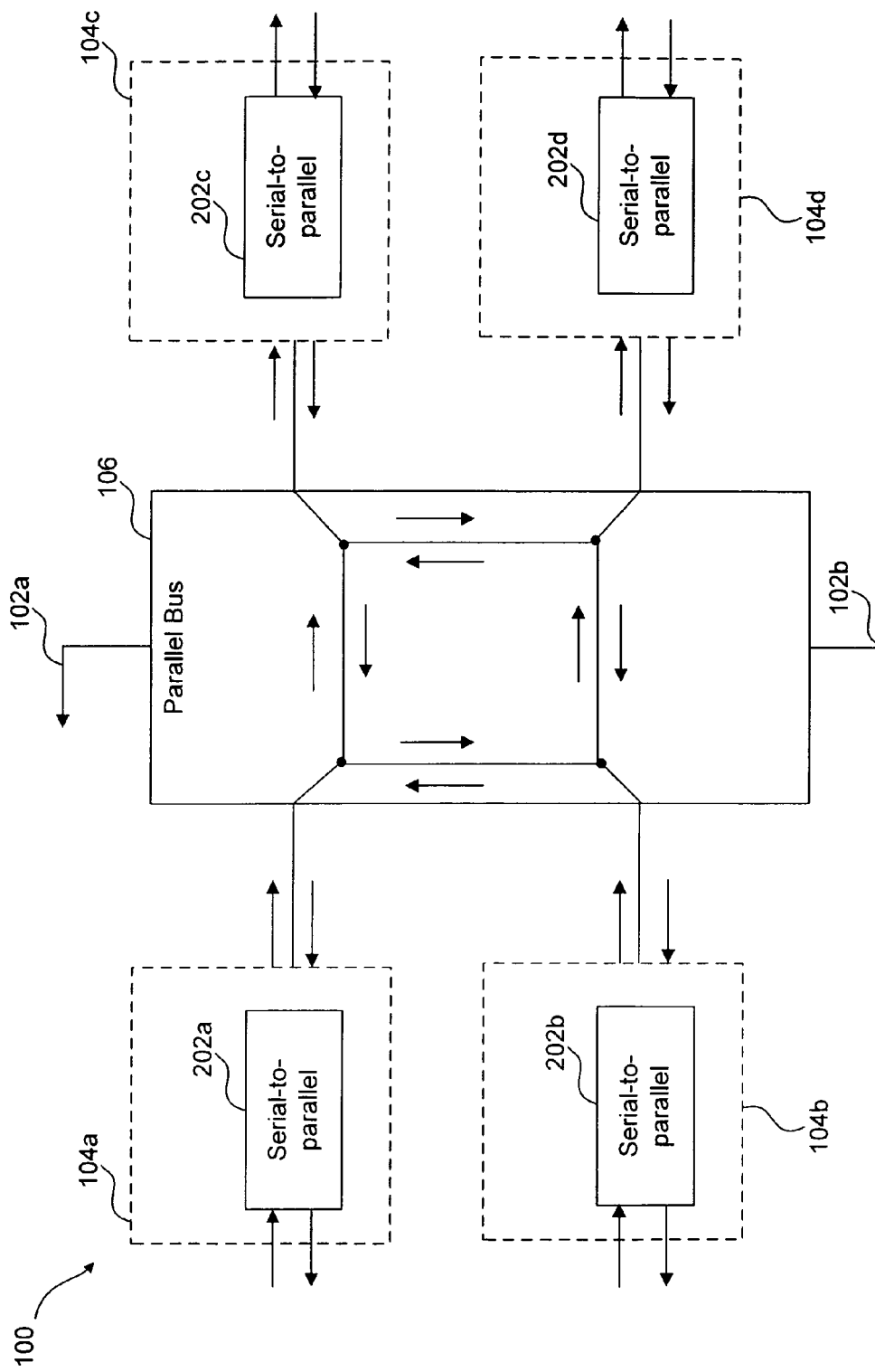
FIG. 2 further illustrates the multi-port Serdes chip including a parallel-to-serial conversion according to embodiments of the present invention.

FIG. 2 illustrates that each serial port 104 can include a serial-to-parallel converter 202, so that serial data processed by the port 104 can be converted to parallel data, and vice versa. In other words, serial data received by serial ports 104 from corresponding switches 108 can be converted to parallel data and routed on the bus 106. The serial-to-parallel converters 202 are bi-directional, so that parallel data from the bus 106 can be converted to serial data for transmission from the serial port 104 to the corresponding switch 108. Furthermore, the parallel data from the bus 106 can also be converted to serial for transmission to the switch 108.

FIG. 2 also illustrates the bus 106 to have a "ring structure" that enables the data to be sent from one adjacent port 104 to another adjacent port 104. For example, data from port 104*a* is directly transmitted to ports 104*b* and 104*c* over the ring structure of the bus 106. Therefore, data from any one port 104 can be connected to another port 104 using the bus 106 by transmitting data around the ring structure of the bus from one port 104 to another port 104. Furthermore, the bus 106 transmits data in a parallel format since it is connected to the parallel side of the serial to parallel converters 202. The parallel format of the bus 106 enables parallel data to be tapped out from the bus 106 at the parallel ports 102*a* and 102*b*. The ring structure of the bus 106 will be further described herein.

Figure 3:
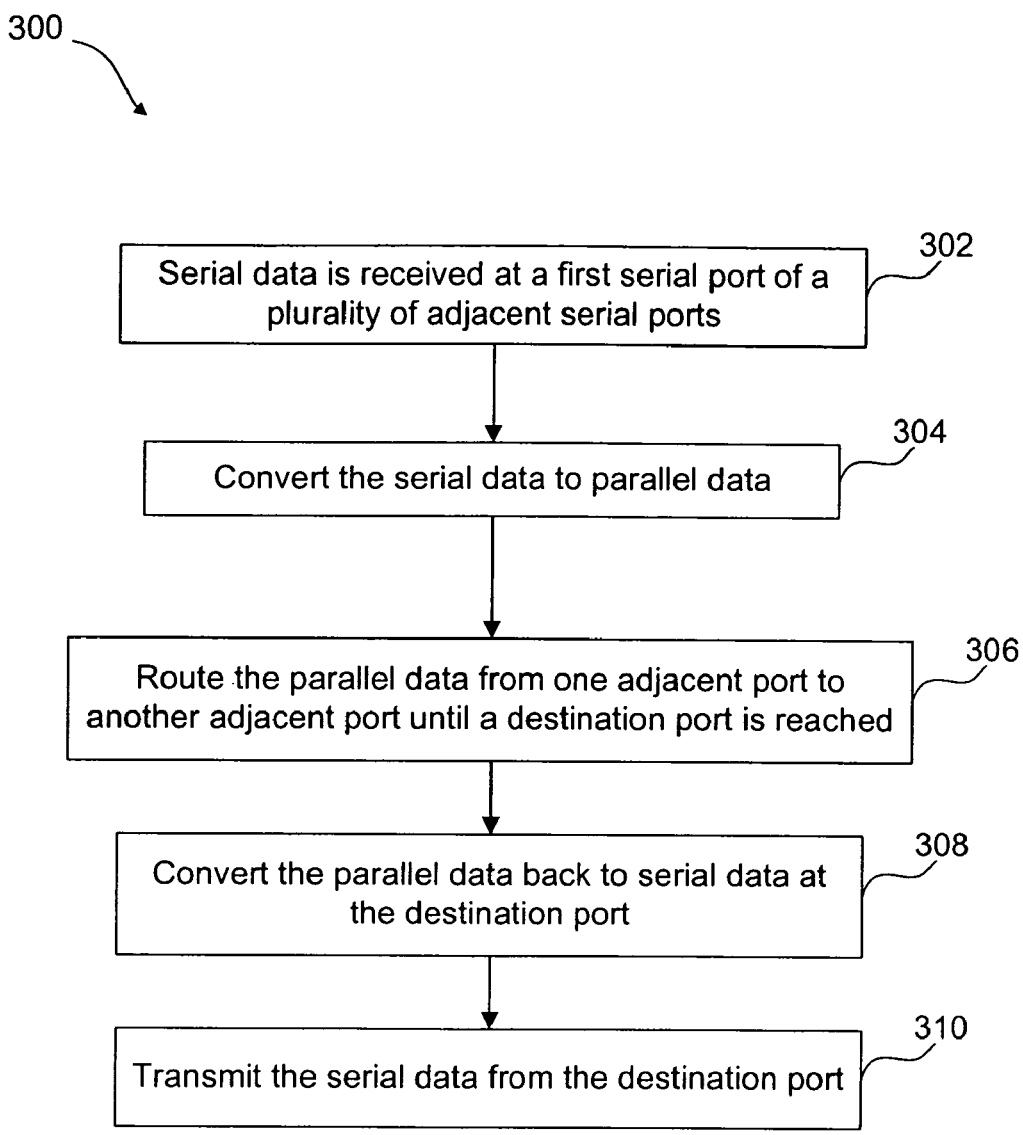
FIG. 3 further illustrates the operation of the transceiver 100 in the routing of serial data between ports according to embodiments of the present invention.

FIG. 3 illustrates a flowchart 300 that further describes the operation of the transceiver 100 in the routing of serial data between ports. In step 302, serial data is received at a first serial port 104, from a switch 108 for example. In step 304, the serial data is converted to parallel data. In step 306, the parallel data is routed from one adjacent port 104 to another via the bus 106 until a destination port 104 is reached. In step 308, the parallel data is converted back to serial. In step 310, the serial data is transmitted from the serial destination port 104, to a destination switch 108 for example.

The ports of the transceiver 100 can be configured to operate over a number of different data standards, as will be described further herein. For example, the serial ports 104 can transmit data to the switches 108 according to an XAUI serial protocol. The XAUI serial data is converted to XGMII parallel data for transmission over the parallel bus 106, and therefore the XGMII parallel data can be tapped-out by the parallel ports 102*a* and 102*b*.

Furthermore, the inverse operation can also be performed. Parallel data is received at a parallel port 102 and routed to the other parallel port 102 or routed to a serial destination port 104. If routed to a serial destination port, then the data is serialized prior to transmission.

Figure 4:
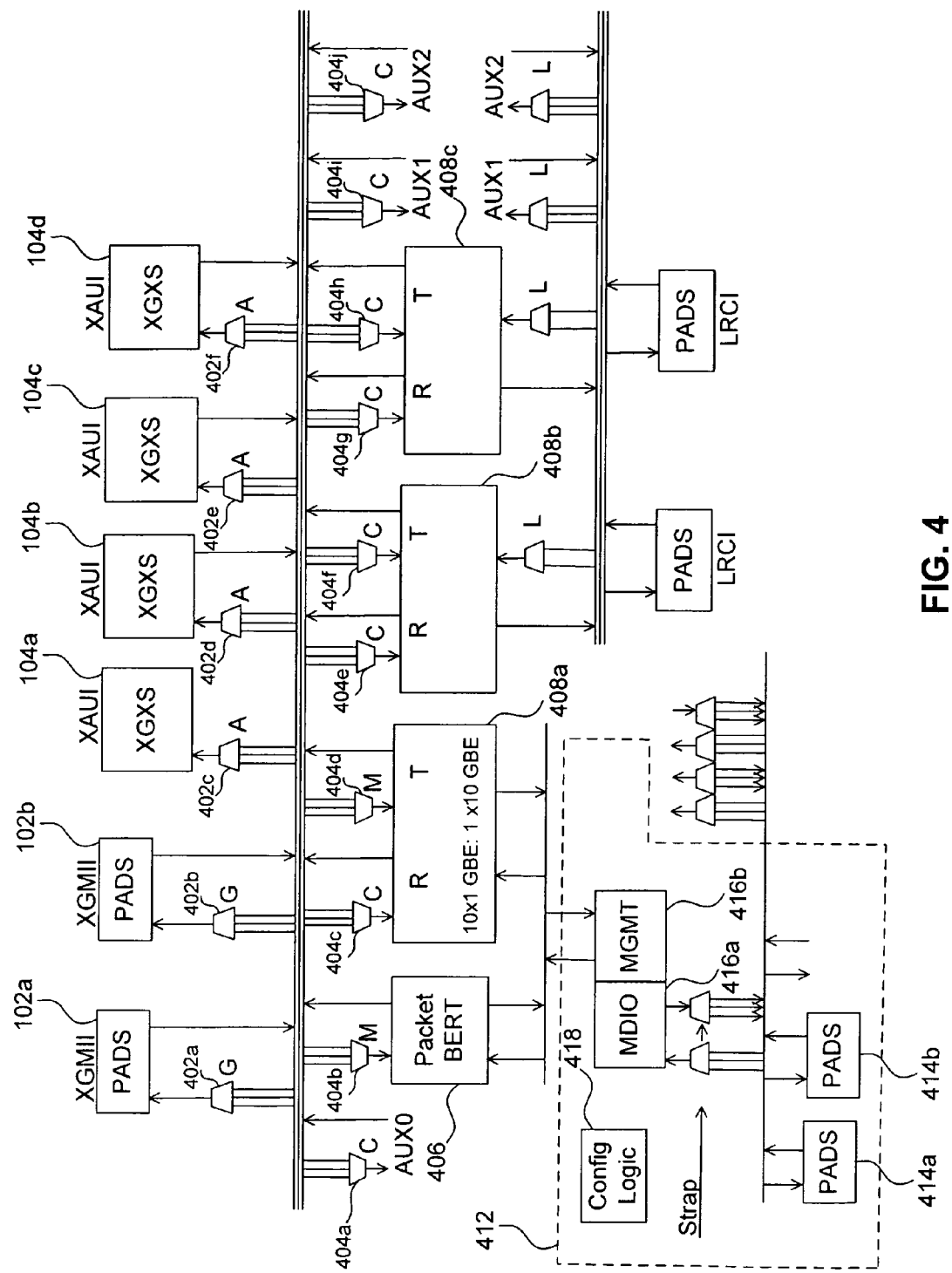
FIG. 4 illustrates a multi-port Serdes transceiver 400, which is one embodiment of the transceiver 100.

FIG. 4 illustrates a multi-port Serdes transceiver 400, which is one embodiment of the transceiver 100. The Serdes transceiver 400 includes multiple parallel ports 102 and serial ports 104, and includes the flexibility to connect any one of the parallel ports 102 to another parallel port 102 or to a serial port 104, or both. Furthermore, the multiport transceiver chip 400 can connect any one of the serial ports 104 to another serial port 104 or to one of the parallel ports 102.

More specifically, the Serdes transceiver chip 400 includes two parallel transceiver ports 102*a,b*, and four serial transceiver ports 104*a-d*. However, the invention is not limited to the number of ports shown. Other configurations having a different number of ports could be used. The parallel transceiver ports 102*a,b* transmit and receive data in a parallel format. The parallel transceiver ports 102*a,b* can be XGMII parallel ports, for example, where the XGMII transceiver protocol is known to those skilled in the arts. Each XGMII port 102 can include 74 data pins, for example, operating at 1/10 the data rate of the serial ports 104. For example, the 74 pins can transmit 36 data signals and receive 36 data signals, simultaneously, and 2 clock signals (1 transmit and 1 receive).

The four serial ports 104*a-d* can be XAUI serial ports, and transmit and receive data in a serial format. Each serial port 104 can be a quad serial port having four serial differential data lines using the XAUI protocol that is known to those skilled in the arts. In embodiments of the invention, the serial ports 104 can operate at data rates of 3.125 GHz, 2.5 GHz, and 1.25 GHz. In other words, the transceiver chip 100 is a multrate device. However, the XAUI data rates above are effectively quadrupled since there are four serial data lines in each serial port 104. Therefore, the 2.5 GHz data rate is equalvalent to a 10 GHz data rate. As discussed above, the parallel data rates can operate at 1/10 of the data rates of the serial data.

The serial ports 104 can be further described as 10 Gigabit extension sub-letter (XGXS). In other words, XGXS defines the parallel-to-serial conversion between the parallel XGMII protocol to serial XAUI protocol, according to the IEEE Std 802.3ae, the entire standard of which is incorporated herein by reference. The serial ports 104 receive serial XAUI data and convert it to parallel XGMII data according the XGXS protocol. The parallel XGMII data is routed from adjacent port to adjacent port on the parallel bus 106.

As discussed above, the parallel ports 102 and the serial ports 104 are linked together by the parallel bus 106. The parallel bus 106 enables data to travel between all the ports 102 and 104. More specifically the bus 106 enables data to travel from one parallel port 102 to another parallel port 102, and to travel from one parallel port 102 to a serial port 104. Multiplexers 402 connect the bus 106 to the parallel ports 102 and to the serial ports 104. The serial port 104 performs a parallel to serial conversion when receiving parallel data that is to be sent out serial. Likewise the bus 106 enables data to travel from one serial port 104 to another serial port 104, and to travel between a serial port 104 and a parallel port 102. The parallel port 102 enables parallel data to be tapped from the parallel bus 106 so that parallel data (e.g. XGMII data) can be transmitted from the transceiver 400. The multi-port Serdes transceiver 400 is highly flexible in being able to connect multiple parallel ports 102 to multiple serial ports 104, and vice versa.

In embodiments, the Serdes transceiver chip 400 can be implemented on a single CMOS substrate. For example, the Serdes transceiver chip 400 can be implemented using a low power 0.13-micron CMOS process technology, which lends itself to higher levels of integration and application.

The transceiver 400 enables dual unit operation, where one parallel port 102 is paired up with two of the serial ports 104 and the other parallel port 102 is paired up with the other two serial ports 104. For example, parallel port 102*a* can be paired with serial ports 104*a* and 104*b*. Likewise, the parallel port 102*b* can be paired with serial ports 104*c* and 104*d*. However, there is complete selectivity of the ports that are grouped together for dual unit operation. For example, parallel port 102*a* can be paired with either serial ports 104*a* and 104*b*, or serial ports 104*c* and 104*d*. In a backplane configuration, this provides flexibility to connect a parallel port to one or more serial ports, and with redundancy.

The transceiver 400 also includes a packet bit error rate tester (BERT) 406. The packet BERT 406 generates and processes packet test data that can be transmitted over any of the serial ports 104 to perform bit error testing. Any type of packet data can be generated to perform the testing and at different data rates. For example, the packet BERT 406 can generate packet data that can be used to test the Serdes data link. As such, the packet BERT 406 provides a built-in self test for the Serdes data link. The packet BERT 406 generates test data that is sent over one or more of the serial ports 104 using the bus 106 to perform the bit error rate testing of the Serdes data link. For example, the packet BERT 406 can generate test data for a data link formed by enabling the serial ports 104*a* and 104*b* to connect the switch 108*a* to the switch 108*c*. Likewise, the packet BERT 406 can capture test data received over any one of the serial ports 104 or parallel ports 102 using the bus 106 for comparison with test data that was sent out. A bit error rate can then be determined based on this comparison.

In one embodiment, the packet BERT 406 is RAM-based so that the test data is stored and compared in a RAM memory to perform the bit error rate test. In another embodiment, the packet BERT 406 is logic based so that the test data is generated by a logic function, and transmitted across a Serdes link. Upon receipt back, the test data is re-generated by the logic packet BERT 406, for comparison with the original test data that was sent over the Serdes data link. A RAM packet BERT 406 is more flexible than a logic packet BERT 406 because there is no limitation on the data that can be stored in the RAM packet BERT 406. However, a logic packet BERT 406 is more efficient in terms of substrate area because a RAM occupies more area than a logic circuit.

Since the packet BERT 406 shares the same bus 106 with the serial ports 104, the packet BERT 406 can monitor (or "snoop") between the serial ports 104. In other words, if data is being transmitted from one serial port 104 to another serial port 104, the packet BERT 406 can capture and store a portion of this data for bit error testing. In one embodiment, the packet BERT 406 "blindly" captures data being sent from one serial port 104 to another serial port 104. In another embodiment, the packet BERT 406 starts capturing data after a particular byte of data is transmitted. In another embodiment, the packet BERT 406 starts capturing data after an error event occurs. The packet BERT 406 is further described in U.S. patent application Ser. No. 10/681,244, filed on Oct. 9, 2003, which is incorporated by reference herein in its entirety.

The Serdes transceiver chip 400 also includes the ability to include other optional logic blocks 408 that are not necessary for the operation of the Serdes transceiver. In other words, the logic blocks 408 could be customer driven logic blocks or some other type of logic block. These optional logic blocks 408 can transmit and receive data over the serial ports 104 or parallel ports 102 using the bus 106. The packet BERT 406 and the optional blocks 408 connect to the bus 106 using the multiplexers 404.

The Serdes transceiver chip 400 also includes a management interface 412 that enables the configuration of the portions (parallel ports 102, series port 104, packet BERT 406, and optional logic blocks 408) of the transceiver chip 100. The management interface 412 includes two pads 414 that enable two different management chips to program and control the portions of the transceiver chip 400 using MDIOs blocks 416. For example, one management chip connected to pad 414*a* could control the parallel port 102*a* and the serial ports 104*a* and 104*b*, and another management chip connected to pad 414*b* could control the parallel port 102*b* and the serial ports 104*c* and 104*d*. The management interface 412 is configured to be compatible with both IEEE Std. 802.3 clause 45 and the IEEE Std. 802.3 clause 22 management standards. In other words, one management pad 414*a* and MDIO block 416*a* can be programmed to be responsive to clause 45 electricals and protocol, and the other management pad 414*b* and MDIO block 416*b* could be responsive to clause 22 electricals and protocol. Furthermore, the management pads 414 and MDIO blocks can mix and match clause 22 and clause 45 electrical and protocols. For example, management pad 414*a* and MDIO block 416*a* can be responsive to clause 22 electricals and clause 45 protocols, and vice versa. Similar mix and match can be done for the management pad 414*b* and the MDIO block 416*b*. The management data pads are further described in U.S. patent application Ser. No. 10/694,729, titled "Multipurpose and Integrated Pad Ring for Integrated Circuit", filed Oct. 29, 2003, and U.S. patent application Ser. No. 10/694,730, titled "Programmable Management I/O Pads for an Integrated Circuit", filed Oct. 29, 2003, both of which are incorporated by reference herein in its entirety.

Figure 5:
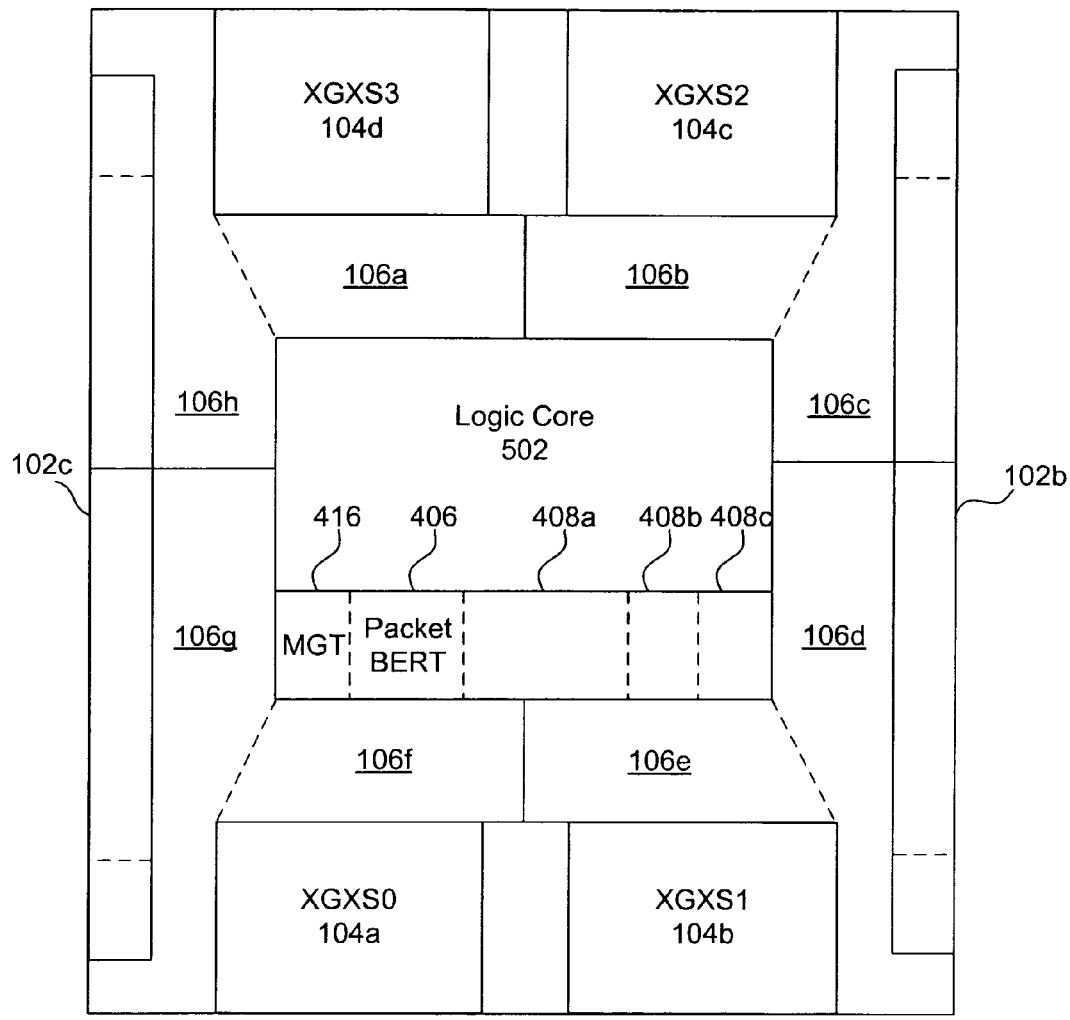
FIG. 5 illustrates a substrate layout of the multi-port Serdes transceiver chip according to embodiments of the present invention.

FIG. 5 illustrates the substrate layout 500 for the Serdes transceiver 400 according to embodiments of the invention. The substrate layout 500 is configured to minimize the substrate area of the transceiver 400, and efficiently provide the port interconnections described above.

The substrate layout 500 is configured so that the parallel ports 102*a,b* and the serial ports 104*a-d* are on the outer perimeter of the substrate 200, as shown. In other words, the serial ports 104*a* and 104*b* are on a first side of the substrate layout 500 and the serial ports 104c and 104d are on a second side of the substrate layout 500. The parallel port 102a is on a third side of the substrate layout 500. And the parallel port 102b is on a fourth side of the substrate layout 500. A logic core 502 is at the center of the substrate 500, where the logic core 502 operates the bus 106 and the serial 104 and parallel 102 data ports. The management interface 412, the packet BERT 406, and the optional logic blocks 408a-c are adjacent to the logic core 502 as shown. The bus 106 can be described as a "ring" structure (or donut "structure") around the logic core 502, and is placed in between the logic core 502 and the data ports 102 and 104 that occupy the parameter of the substrate layout 500. Furthermore, the ring structure of the bus 106 also provides efficient communication between the logic core 502 and the various data ports 102 and 104. Furthermore, the ring structure of the bus 106 also provides efficient communication between the management interface 412, the packet BERT 406, the optional logic blocks 408, and the various data ports 102 and 104.

The bus 106 is illustrated as 8 sections 106a-106g for ease of illustration. Each section provides an interface to the respective data ports 102 or 104 that are adjacent to the respective sections.

Figure 6:
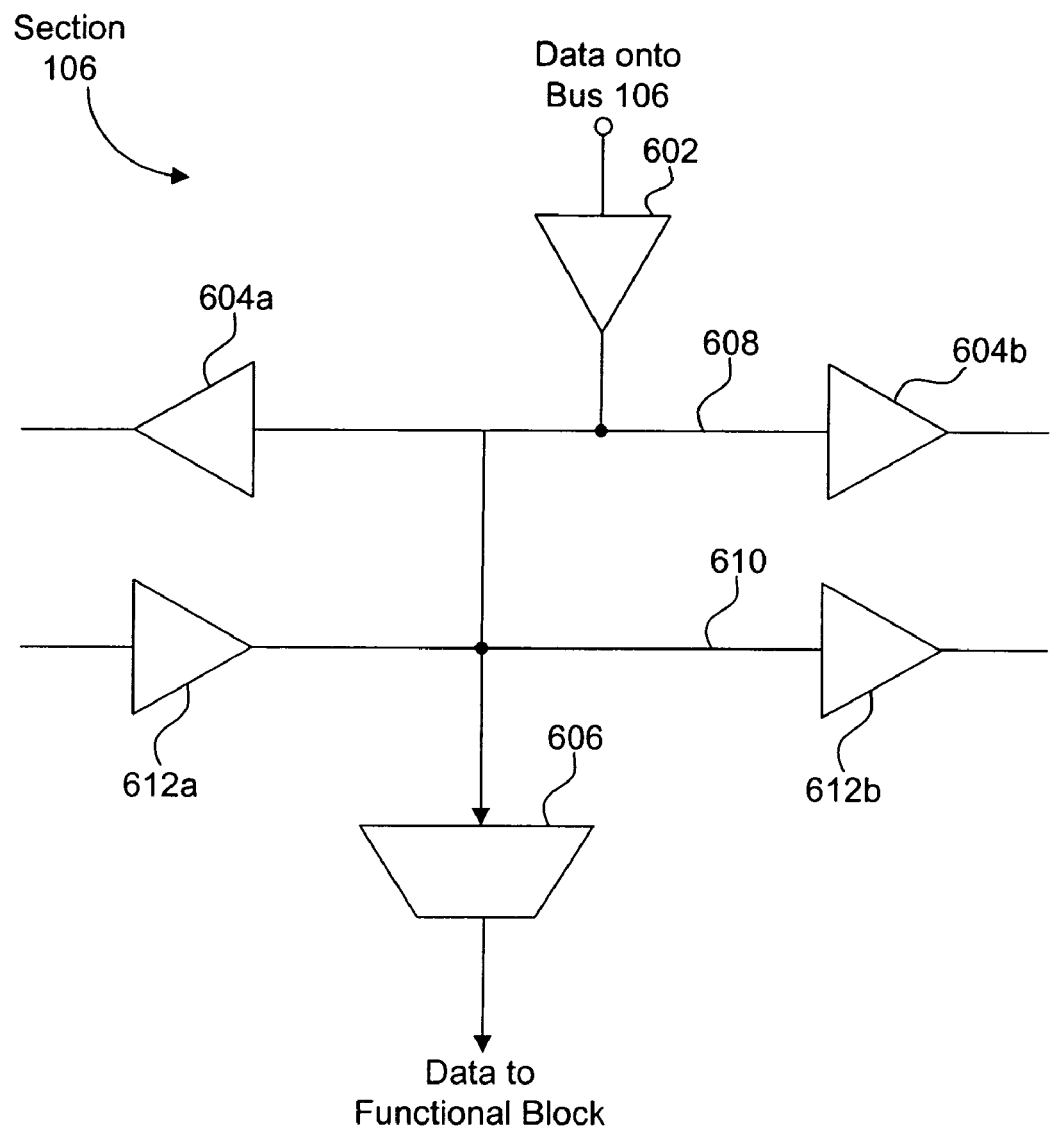
FIG. 6 illustrates a section of the bus 106 according to embodiments of the present invention.

FIG. 6 represents one of the 8 sections 106a-106g of the bus 106 according to embodiments of the present invention. Each section of the bus 106 can be represented as two paths 608 and 610. Data enters the bus 106 through a buffer 602 and proceeds to its destination along the path 608 and through the buffers 604. Data passes from one section to another section of the bus 106 using the path 610 and passing through the buffers 612. The mux 606 represents data passing from the bus 106 to a functional block, such as a data port 102, 104 or the packet BERT 406. The actual wires and buffers on the bus 106 are matched to minimize signal distortion.

In embodiments, the data wires in the bus 106 are deposited on the substrate 500 in a particular fashion. Namely, a power or ground is placed between adjacent (or near by) data wires. Furthermore, adjacent data wires on the bus 106 are placed on two separate layers. Therefore, a power or ground will be above or below a data wire, and adjacent to a data wire. Therefore, two nearby data wires will not be located directly adjacent one another, but instead will be positioned diagonal to each other, thereby reducing cross talk.

The parallel bus 106 is further described in U.S. patent application Ser. No. 10/695,458, titled "Cross Link Multiplexer Bus", filed Oct. 29, 2003, and incorporated by reference herein in its entirety.

The multi-port Serdes transceiver 400 supports multiple different data protocols at the pads including XGMII, TBI, RTBI, HSTL, SSTL, or LVTTL protocols, and others.

Figure 7:
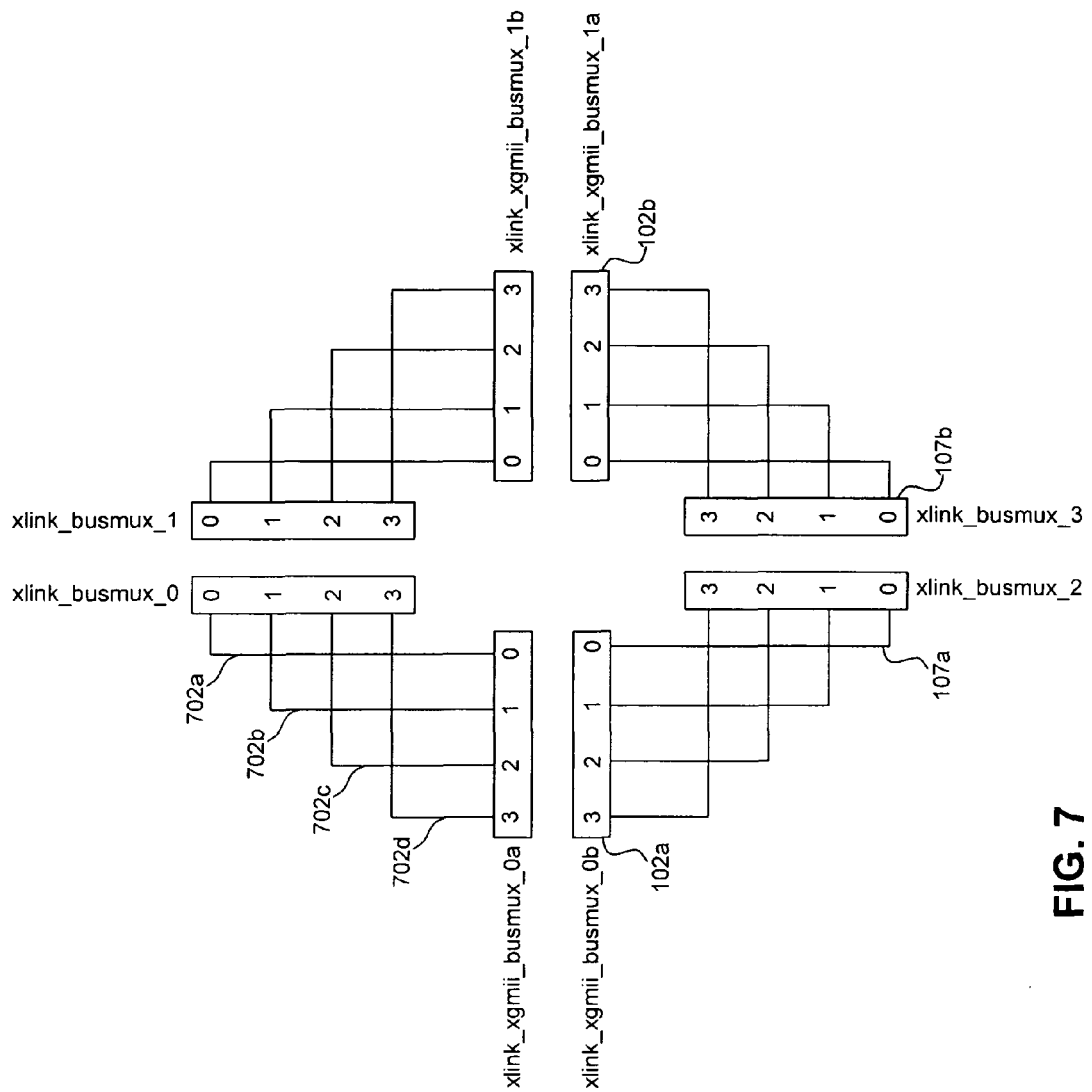
FIG. 7 further illustrates the bus 106 having equal length transmission lines according to embodiments of the present invention.

FIG. 7 further illustrates an example layout of the bus 106. The wires 702 between data ports 102, 104 are configured to have the same path lengths so as to minimize signal distortion. In other words, wires 702a-d are deposited so as to have the same path length so as to reduce signal distortion.

The multi-port Serdes transceiver 400 includes the ability to change the timing of the data ports 102 and 104. This includes the ability to change the timing between the data and clock signals. In other words, the registers in the data ports 102 and 104 can be re-programmed to operate at different timing protocols.

The Serdes transceiver 400 is highly flexible and can be configured to provide multiple different transceivers by enabling and disabling various serial and parallel data ports. This is accomplished using a configuration logic circuit 418 that controls the registers and timing of the data ports 102 and 104, and also enables/disables these data ports. As a result, several different transceiver products can be configured from a single semiconductor die that is manufactured with the 4 serial data ports and 2 parallel data ports. For instance, FIG. 1 illustrates an embodiment, where all four serial ports 104 and both parallel ports 102 are enabled and accessible to exchange data. The transceiver 400 represents the maximum capability that can be achieved from the 4 serial and two parallel data ports. Other specific examples are discussed below, but the invention is not limited to these examples.

Figure 8:
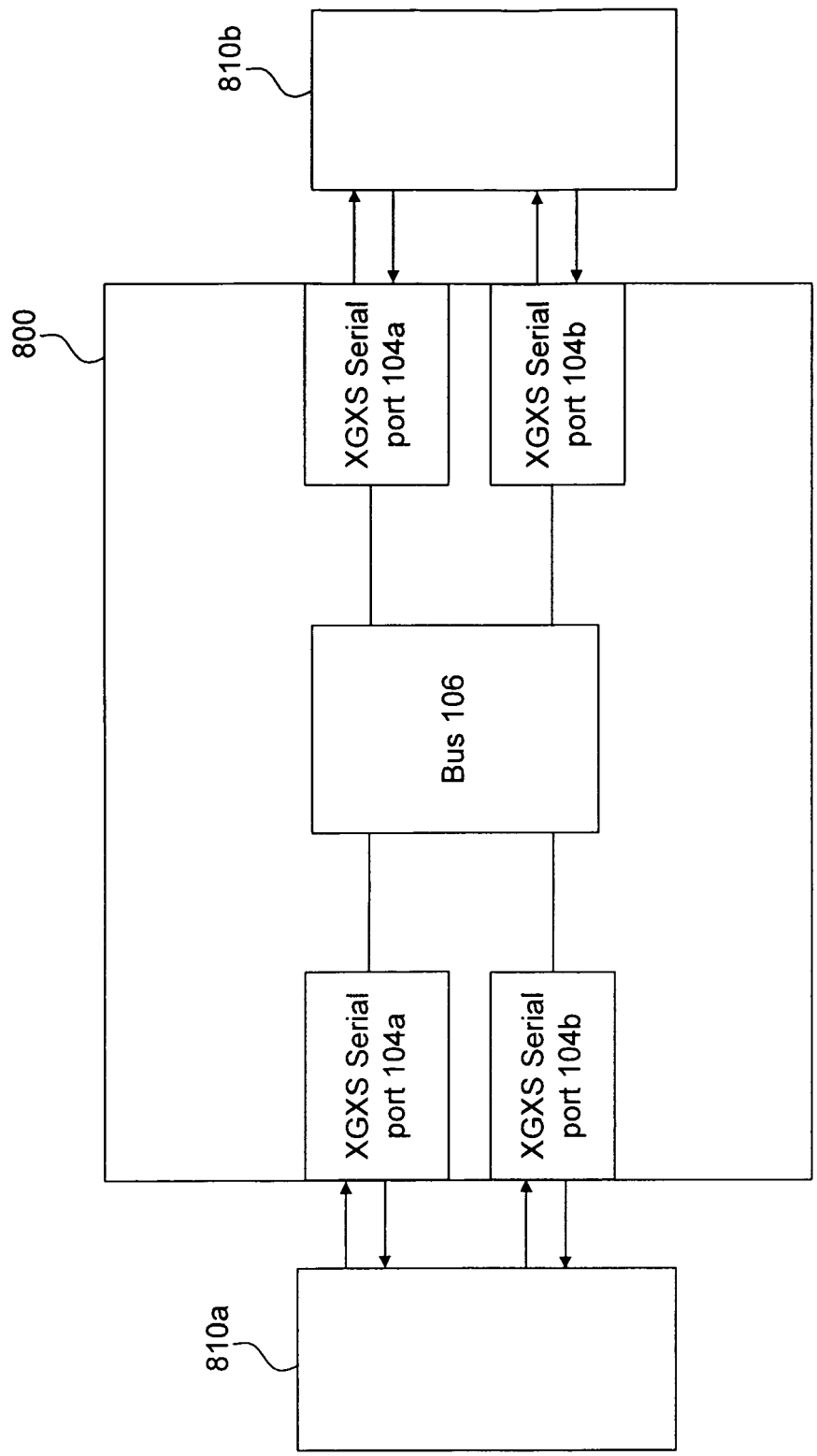
FIG. 8 illustrates a transceiver 800, which one configuration of the transceiver 400.

FIG. 8 illustrates a transceiver 800 having 4 serial XGXS data ports 104. The two parallel ports 102 have been disabled using configuration logic 418 and/or by not bonding the parallel ports to the output pins of the semiconductor package. The transceiver 800 enables a first physical layer device 810a (e.g., a backplane or a laser module) to exchange data with a second physical layer device 810b.

Figure 9:
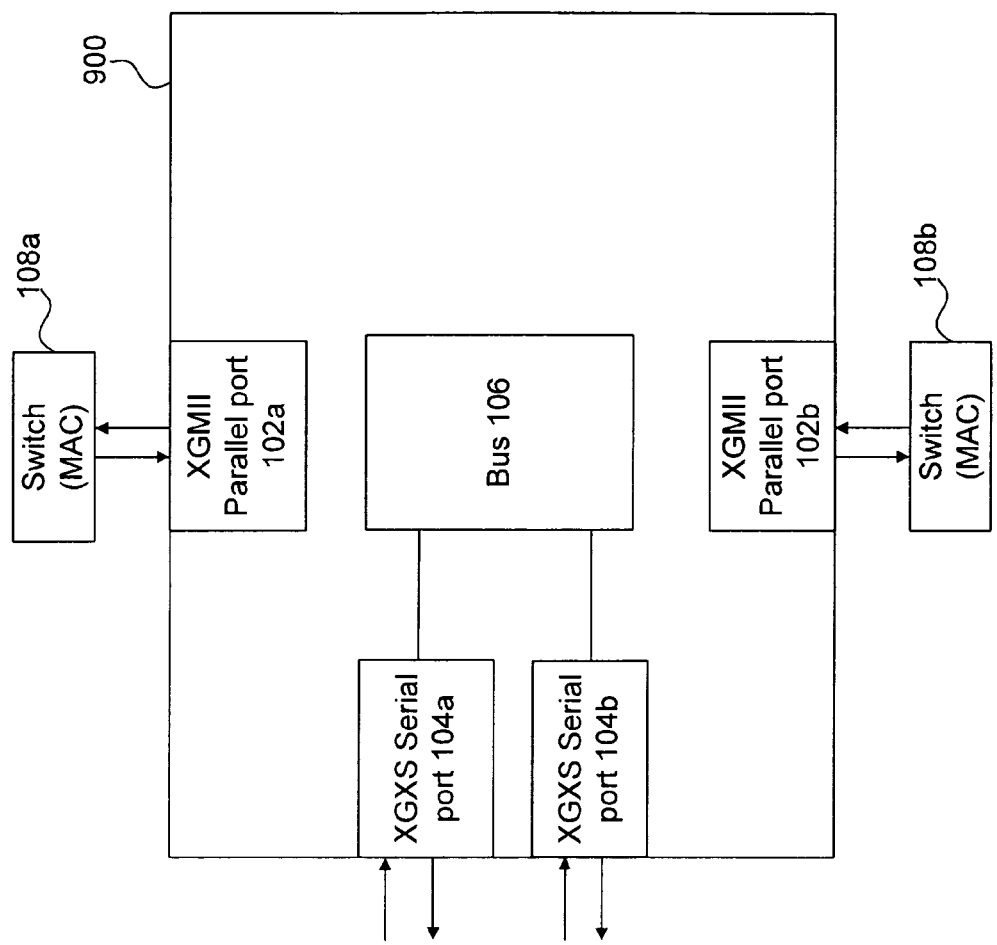
FIG. 9 illustrates a transceiver 900, which is another configuration of the transceiver 400.

FIG. 9 illustrates a transceiver 900 having 2 serial XGXS data ports 104a and 104b and two XGMII parallel data ports 102a and 102b. The other two serial data ports 104c and 104d have been disabled using configuration logic 418 and/or by not bonding the ports to the output pins of the semiconductor package. The transceiver 900 enables the switch 108a to exchange data with the switch 108b, and allows the parallel XGMII data to be tapped from the parallel bus 106 using the parallel XGMII data ports 102a 102b.

In another embodiment of FIG. 9, the timing of the serial and parallel ports is varied to provide another transceiver product. For instance, the two XGXS serial ports can be configured as 8 Serdes ports that operate at a slower data rate than the XGXS data ports. Likewise, the two XGMII parallel data ports can be configured as 8 TBI data ports that also operate at a slower data rate. In general, the timing of the data ports can be revised and reconfigured for each of the transceiver configurations shown herein.

Figure 10:
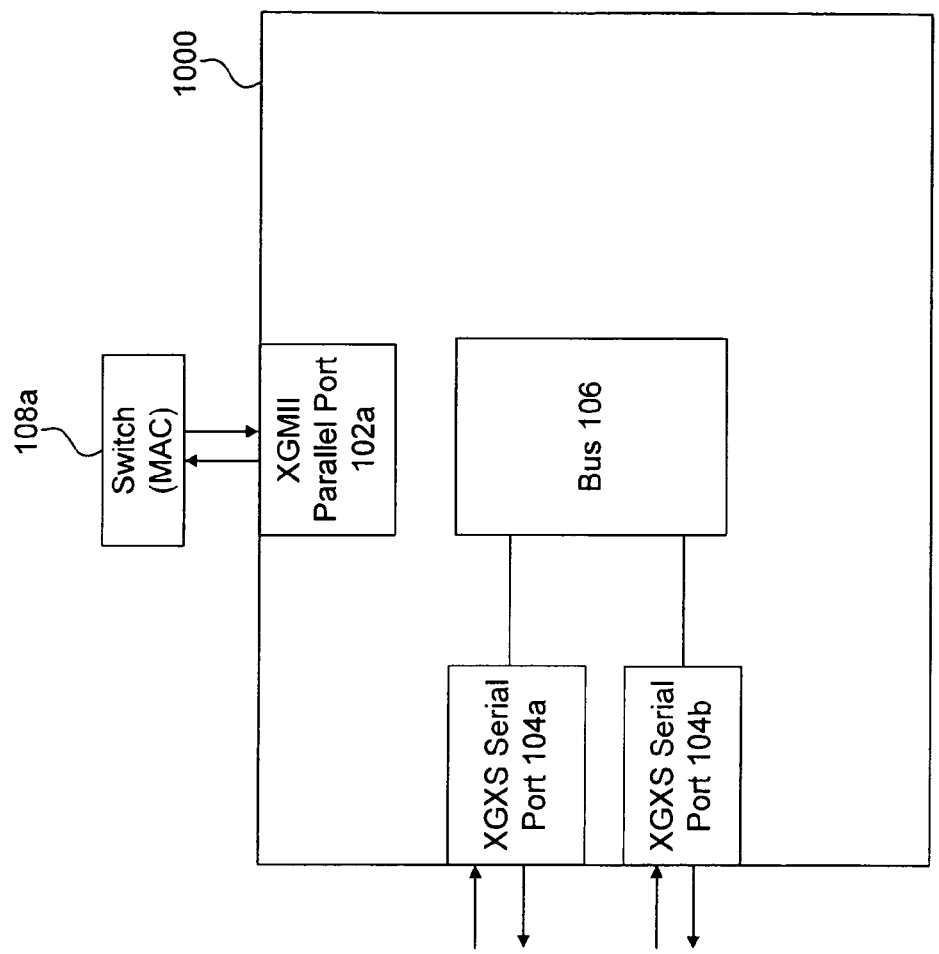
FIG. 10 illustrates a transceiver 1000, which is another configuration of the transceiver 400.

FIG. 10 illustrates a transceiver 1000 having 2 serial XGXS data ports 104a and 104b and only one XGMII parallel data port 102a. The other two serial data ports 104c and 104d and the parallel port 102b have been disabled using configuration logic 418 and/or by not bonding the ports to the output pins of the semiconductor package. The transceiver 1000 enables data to be exchanged between serial data ports 104c and 104d, and allows the parallel XGMII data to be tapped from the parallel bus 106 using the parallel XGMII data port 102a.

Figure 11:
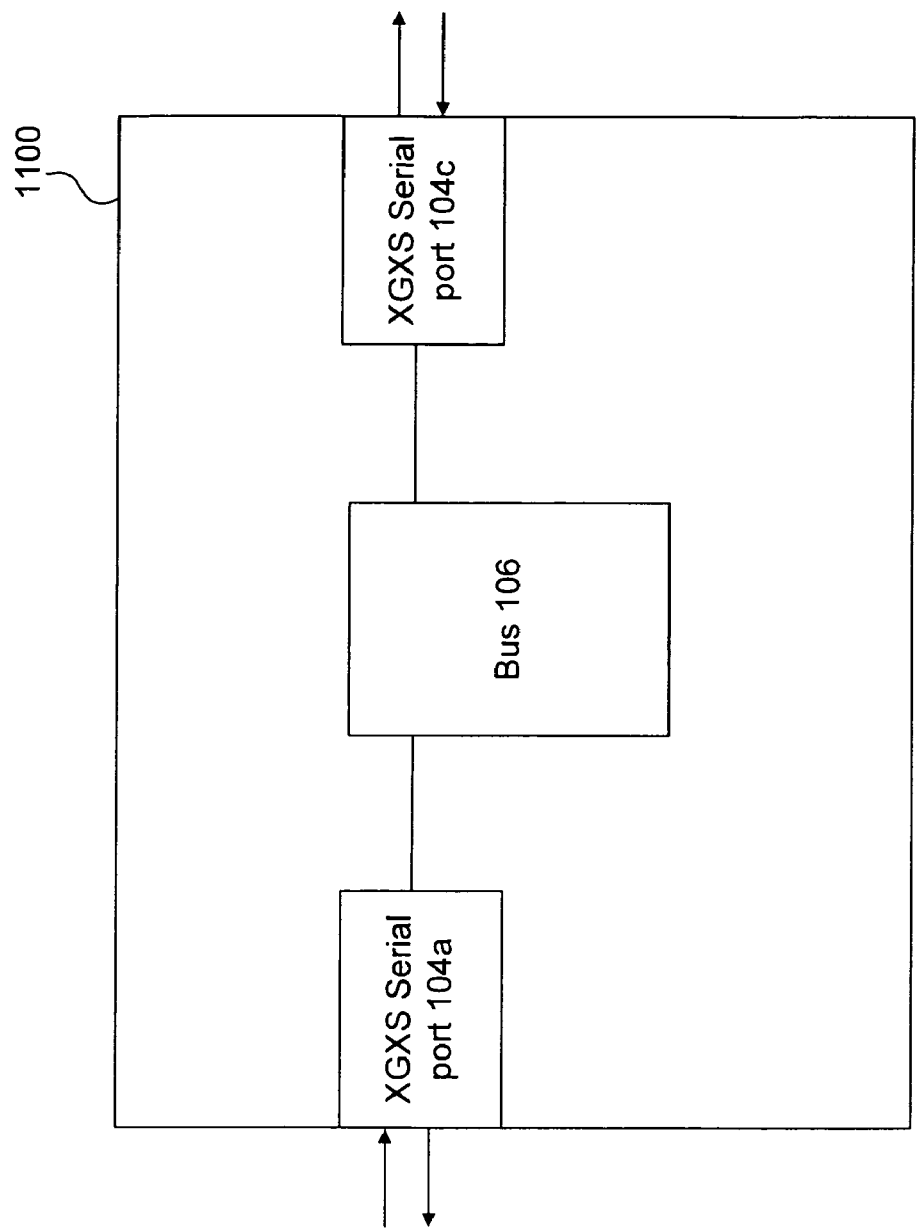
FIG. 11 illustrates a transceiver 1100, which is another configuration of the transceiver 400.

FIG. 11 illustrates a transceiver 1100 having 2 serial XGXS data ports 104a and 104c and no XGMII parallel data port 102a. The other two serial data ports 104c and 104d and the parallel ports 102 have been disabled using configuration logic 418 and/or by not bonding the disabled ports to the output pins of the semiconductor package. The transceiver 1100 enables data to be exchanged between serial data ports 104a and 104c.

Figure 12:
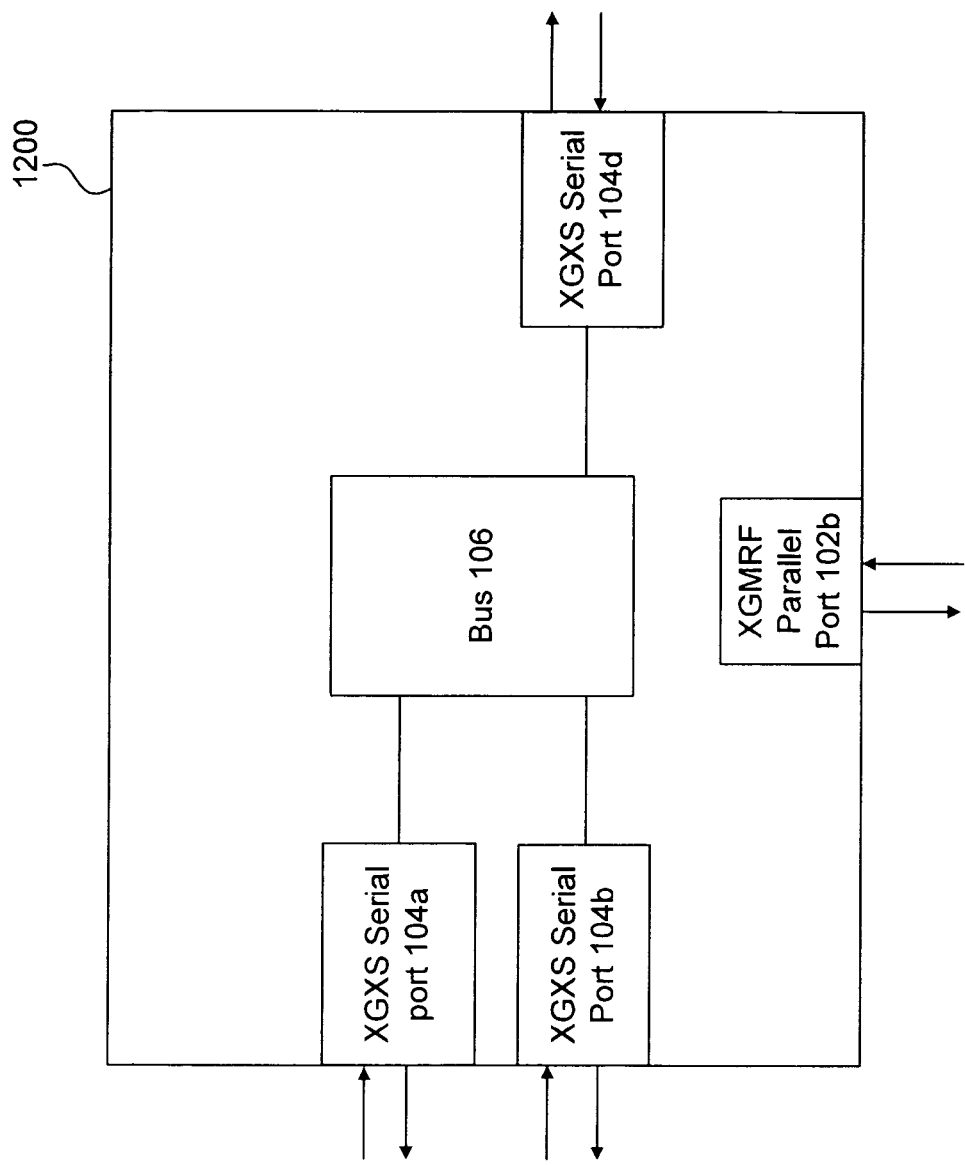
FIG. 12 illustrates a transceiver 1200, which is another configuration of the transceiver 400.

FIG. 12 illustrates a transceiver 1200 having 3 serial XGXS data ports 104a, 104b, and 104d and one XGMII parallel data port 102a. The other serial data ports 104c and the parallel port 102a have been disabled using configuration logic 418 and/or by not bonding the disabled ports to the output pins of the semiconductor package. The transceiver 1200 enables data to be exchanged between serial data ports 104a, 104b, and 104d.

Based on the above discussion, it is apparent that the base transceiver 400 is highly flexible and enables multiple transceiver products, with different capabilities and price points, to be configured and sold from the base semiconductor die.

Automatic Polarity Swap

Figure 13:
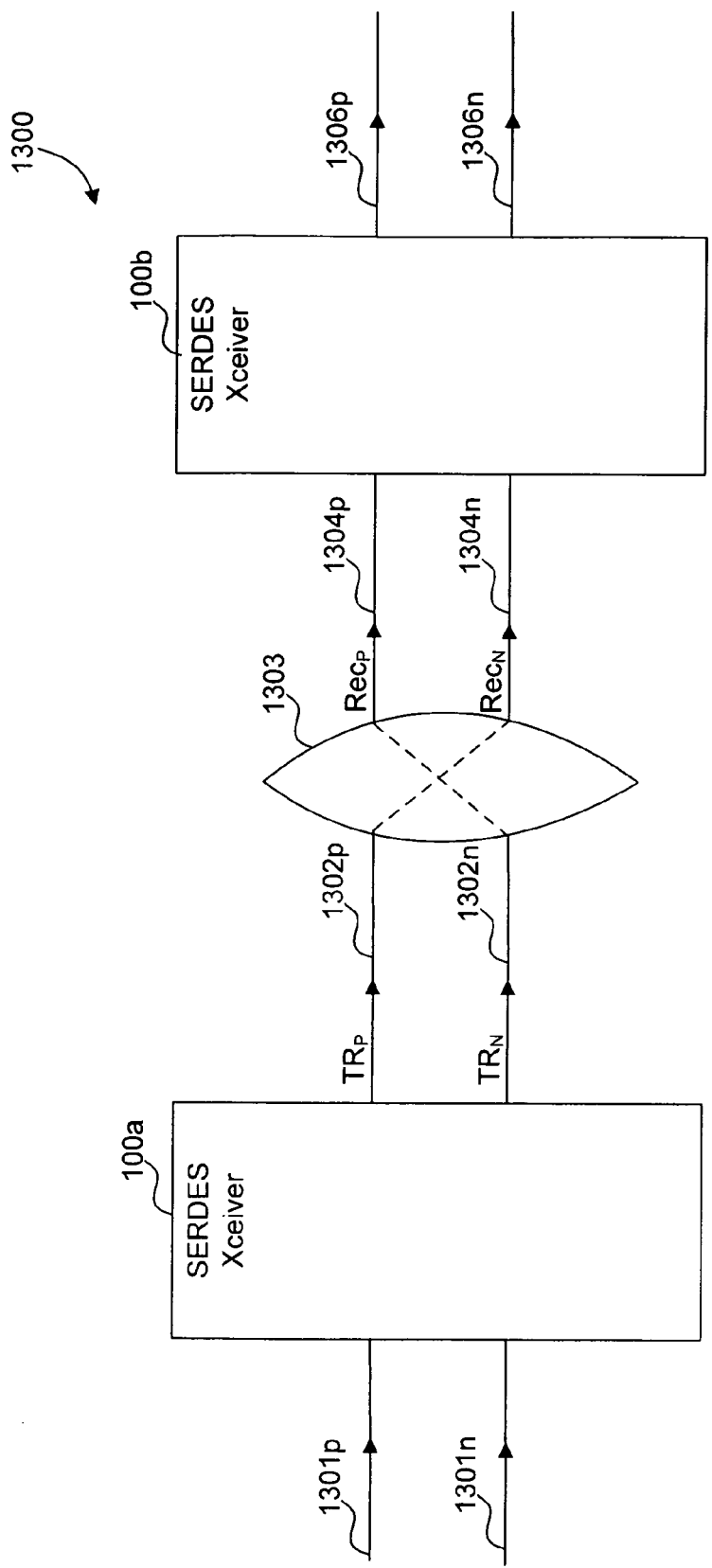
FIG. 13 illustrates a communications system with a backplane interface.

FIG. 13 illustrates a communications system 1300 having a first Serdes transceiver 100a that communicates data with a second Serdes transceiver 100b through an interface 1303, that may be a backplane for example. The Serdes transceivers 100a and 100b can be any type of the transceivers discussed herein, or any other type of transceiver. The Serdes transceiver 100a can be represented as having a differential input 1301p and 1301n and a differential output 1302p and 1302n. Likewise, the Serdes transceiver 100b can be described as having a differential input 1304p and 1304n, and a differential output 1306p and 1306n.

During the configuration of the backplane 1303, the differential output 1302 of the transceiver 100a can be mistakenly cross-connected with the differential input 1304 of the Serdes transceiver 100b. In other words, the 1302n output of the transceiver 100a can be mistakenly connected to the 1304p input of the transceiver 10b. Likewise, the 1302p output of the transceiver 100a can be mistaken connected to the 1304n input of the transceiver 100a. The result of such a cross-connection is that invalid data words are received at the Serdes transceiver 100b, which causes an increase in the bit error rate (BER).

Figure 14:
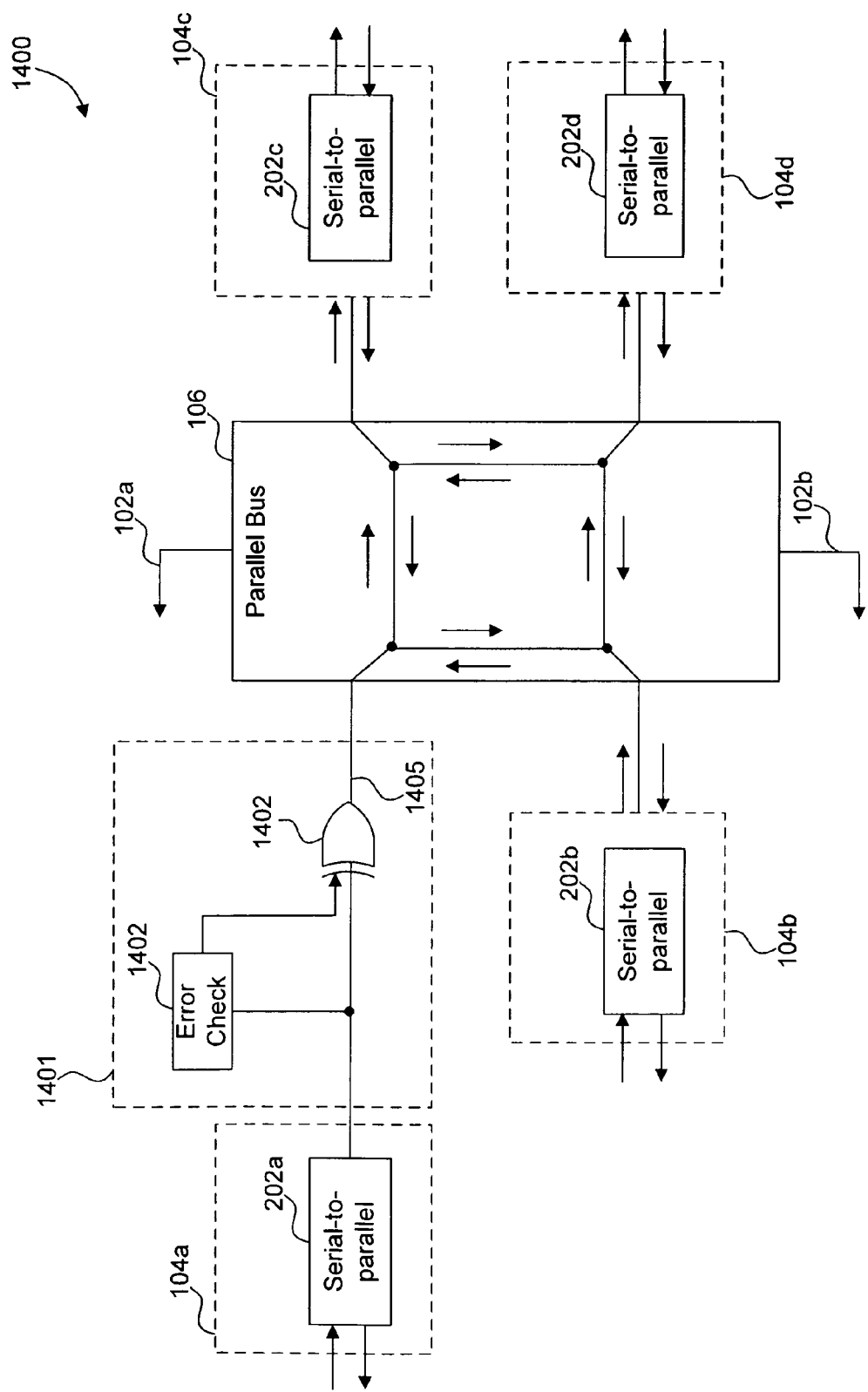
FIG. 14 illustrates a transceiver 1400 with automatic polarity swap according to embodiments of the present invention.

FIG. 14 illustrates an apparatus and method of automatic polarity swap to address the cross-connection problem discussed with reference to FIG. 13. FIG. 14 illustrates a transceiver 1400 having an error check and correction module 1401. The error check and correction module 1401 includes an error check 1402 and a exclusive OR (X-OR) 1404. The error check and correction module 1401 is coupled to the output of the serial-to-parallel converter 202 and checks the digital output of the serial-to-parallel converter 202 to determine if it is a valid digital word. If it is not a valid digital word, then the module 1401 performs an automatic polarity flip of the digital word.

The error check and correction module 1401 includes an error check 1402 at the output of the parallel-to-serial converter 202a. The error check module 1402 examines the digital word at the output of the parallel-to-serial converter 1402 and determines if it is a valid digital word within the context of the communications system 1300. For example, the error check module 1402 can include a RAM memory that stores the possible digital word combinations for comparison with the digital word output of the serial-to-parallel converter 202. If the digital word output of the serial-to-parallel converter 202a does not match any one of the possible combinations, then the digital word output of the serial-to-parallel converter is not a valid digital word. Accordingly, one possibility is that the interface 1303 is cross-connected as discussed above. If this is so, then flipping the polarity of the bits that make up the digital word, will convert the invalid digital word to a valid digital word. This can be accomplished using an exclusive-OR gate 1404. When the error check module 1402 detects an invalid digital word, then the error check module 1402 sends a control bit logic "1" to the exclusive-OR 1404, which causes the exclusive OR to invert the digital output from the serial-to-parallel converter, and generate a inverted digital word 1405. If the error was introduced by the cross-connection, then the inverted digital word 1405 will be a valid digital word.

The error check module 1402 outputs a control bit "0" when it determines that the digital word at the output of the serial-to-parallel converter is a valid digital word. A control bit "0" does not invert the digital word, so that the digital word passes unchanged for further processing.

The error check and correction module 1401 can be implemented using other configurations as will be understood by those skilled in the arts based on the discussion given herein. For instance, a logic circuit other than an X-OR can be used to flip the polarity of the digital word if it is invalid.

An advantage of implementing the automatic polarity swap is that cross-connect errors are rectified quickly and easily, without having to re-wire or re-configure any hardware. Furthermore, the polarity swap can be implemented on the transmit side or the receive side. However, the receive implementation is shown in FIG. 14. The transmit implementation will be apparent based the description related to FIG. 14.

Figure 15:
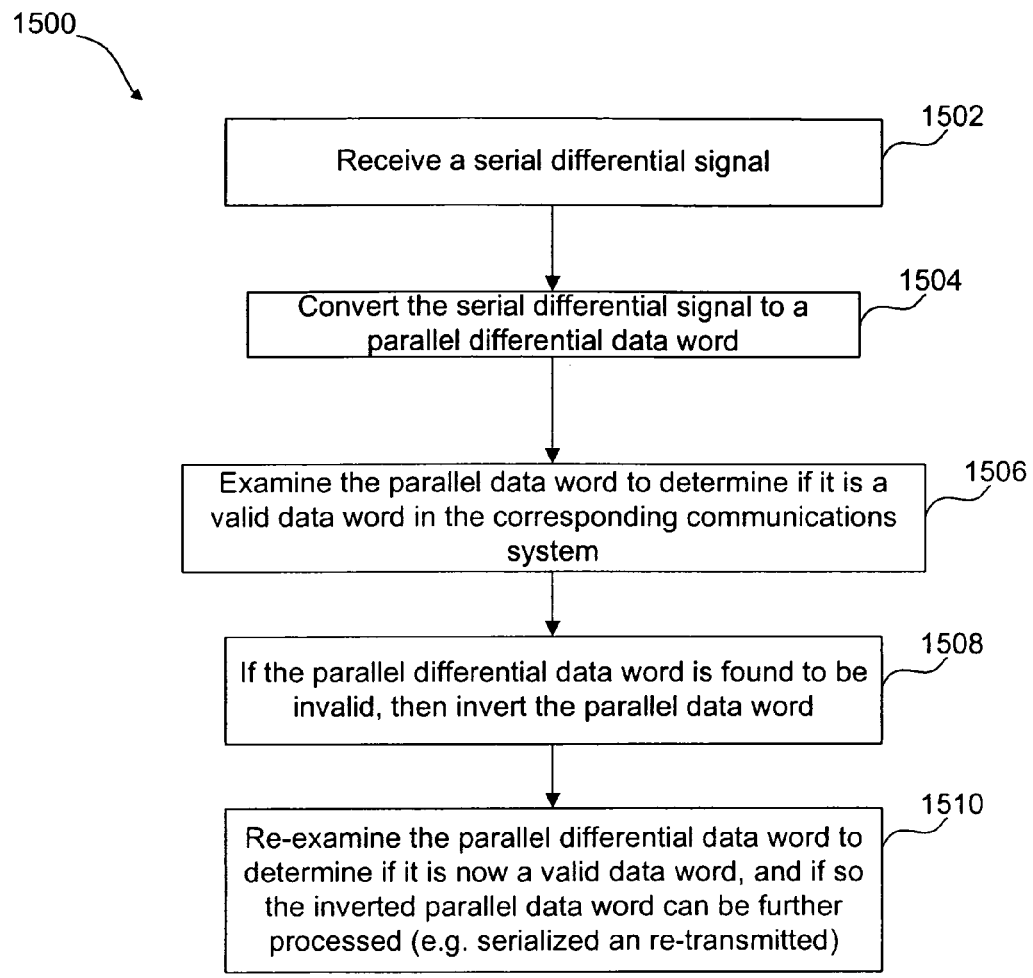
FIG. 15 illustrates a flowchart that further describes automatic polarity swap according to embodiments of the present invention.

FIG. 15 illustrates a flowchart 1500 that further describes an automatic polarity swap according to embodiments of the present invention.

In step 1502, a serial differential signal is received. In step 1504, the serial differential signal is converted to a parallel differential data word.

In step 1506, the parallel differential data word is examined to determined if it is a valid data word for the corresponding communications system. For instance, the parallel differential data word can be compared with valid data words that are stored in a RAM. If the parallel differential data word is valid, then it is passed unmodified for further processing. For example, a valid data word can be re-serialized and transmitted to a destination switch or MAC.

In step 1508, the parallel differential data word is inverted if the parallel differential data word is found to be invalid in step 1506. For instance, a logic circuit (such as the X-OR 1404) can be used to invert the parallel data word is if it is invalid.

In step 1510, the inverted parallel data word can be re-examined to determine if it is now a valid data word, and if so the inverted parallel data word can be further processed. For example, the inverted parallel data word can be serialized and retransmitted to a destination switch, or MAC.

Automatic Fail Switchover

Figure 16:
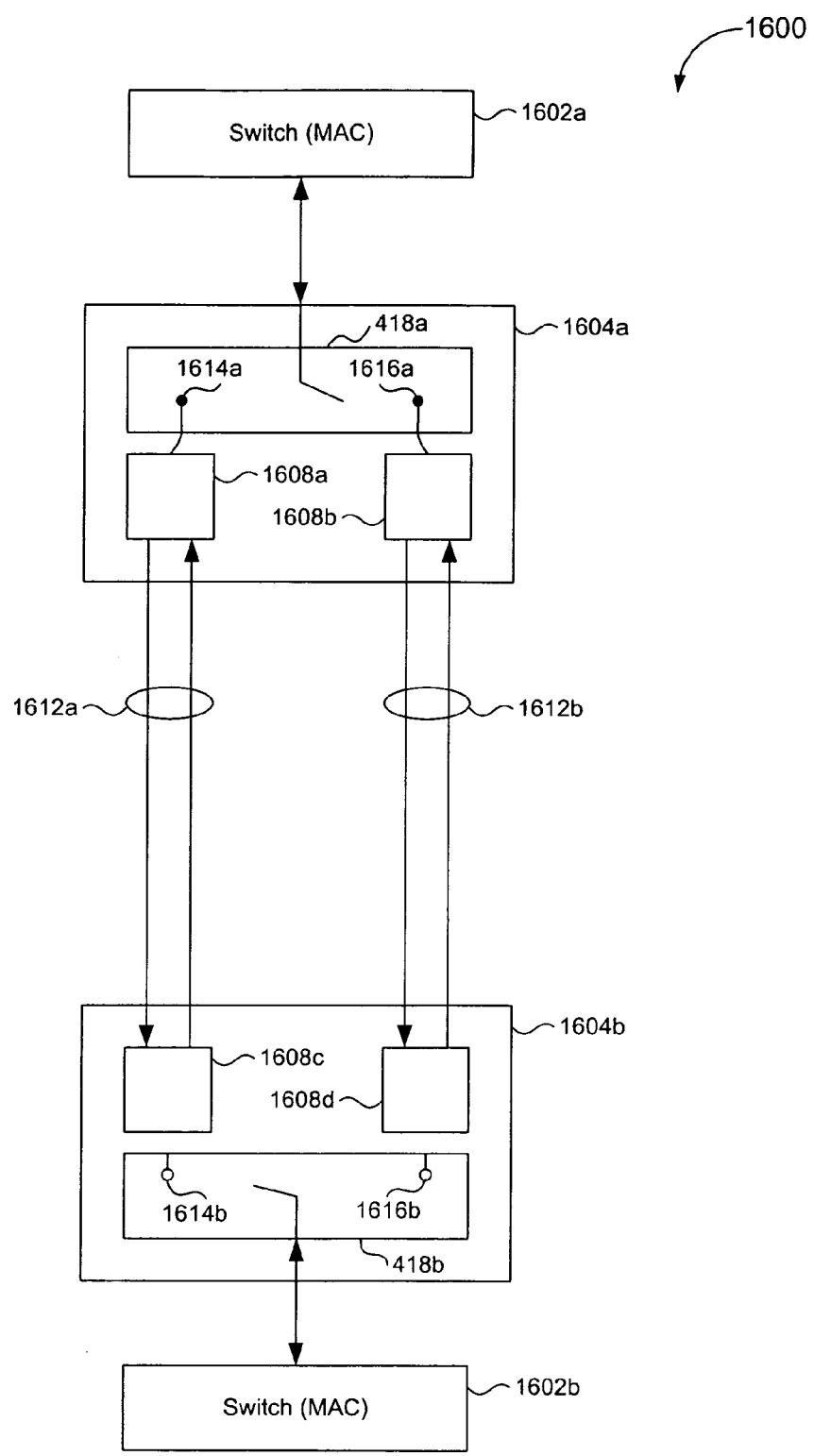
FIG. 16 illustrates a system utilizing automatic fail switchover according to an embodiment of the present invention.

FIG. 16 illustrates a system 1600 utilizing automatic fail switchover according to an embodiment of the present invention. System 1600 includes switches 1602a-b, transceivers 1604a-b, and channels 1612a-b. In the embodiment of FIG. 16, switches 1602a-b communicate with each other via channel 1612a or channel 1612b. Transceivers 1604a-b determine which channel 1612a or 1612b switches 1602a-b use to communicate.

In the following discussion, elements of system 1600 may be referred to generally with a reference number only (i.e., without a reference letter). For example, the discussion may refer to "transceiver 1604" if the discussion is similarly applicable to both transceiver 1604a and transceiver 1604b. However, referring to an element using both a reference number and a reference letter (e.g., transceiver 1604a) does not suggest that the discussion is not applicable to another element (e.g., transceiver 1604b) of system 1600.

Referring to FIG. 16, each transceiver 1604 includes configuration logic 418 and two ports 1608 for illustrative purposes. Transceivers 1604a-b can include any number of ports 1608. A port 1608 can be one or more serial ports 104 or one or more parallel ports 102, as described above with reference to FIG. 1. Configuration logic 418 is depicted as a switch in FIG. 16 for illustrative purposes. The switch has a first terminal 1614 and a second terminal 1616. When the switches in transceivers 1604a-b are coupled to first terminals 1614a-b, respectively, data flows between port 1608a of transceiver 1604a and port 1608c of transceiver 1604b via channel 1612a. When the switches are coupled to second terminals 1616a-b, respectively, data flows between ports 1608b and 1608d via channel 1612b.

According to an embodiment, communications between switches 1602a-b are monitored for a failure. A failure can be based on non-responsiveness of a channel, a local or remote fault, the number of illegal code words detected, frequency variation exceeding a threshold, the number of packets transferred per unit of time falling below a threshold, etc.

Automatic fail switchover allows communications to be automatically switched from one channel 1612*a* or 1612*b* of system 1600 to another channel 1612*b* or 1612*a* of system 1600 upon detection of a failure. Automatic fail switchover is performed automatically by system 1600, so that an external signal is not needed.

Failure monitoring and/or detection may be performed using hardware, software, firmware, or any combination thereof. For example, a BERT can generate and process test packet data to determine whether data is being properly transferred via a channel 1612*a* or 1612*b*. If the BERT determines that a failure has occurred with respect to a particular channel 1612*a* or 1612*b*, then communications assigned to that channel 1612*a* or 1612*b* are re-assigned to another channel 1612*b* or 1612*a* of system 1600. In an embodiment, failure monitoring and/or detection is performed at a PHY layer of system 1600.

A channel 1612*a* or 1612*b* for which a failure is detected may be disabled, though the scope of the invention is not limited in this respect. For instance, the driver associated with that channel 1612*a* or 1612*b* may be deactivated.

Figure 17:
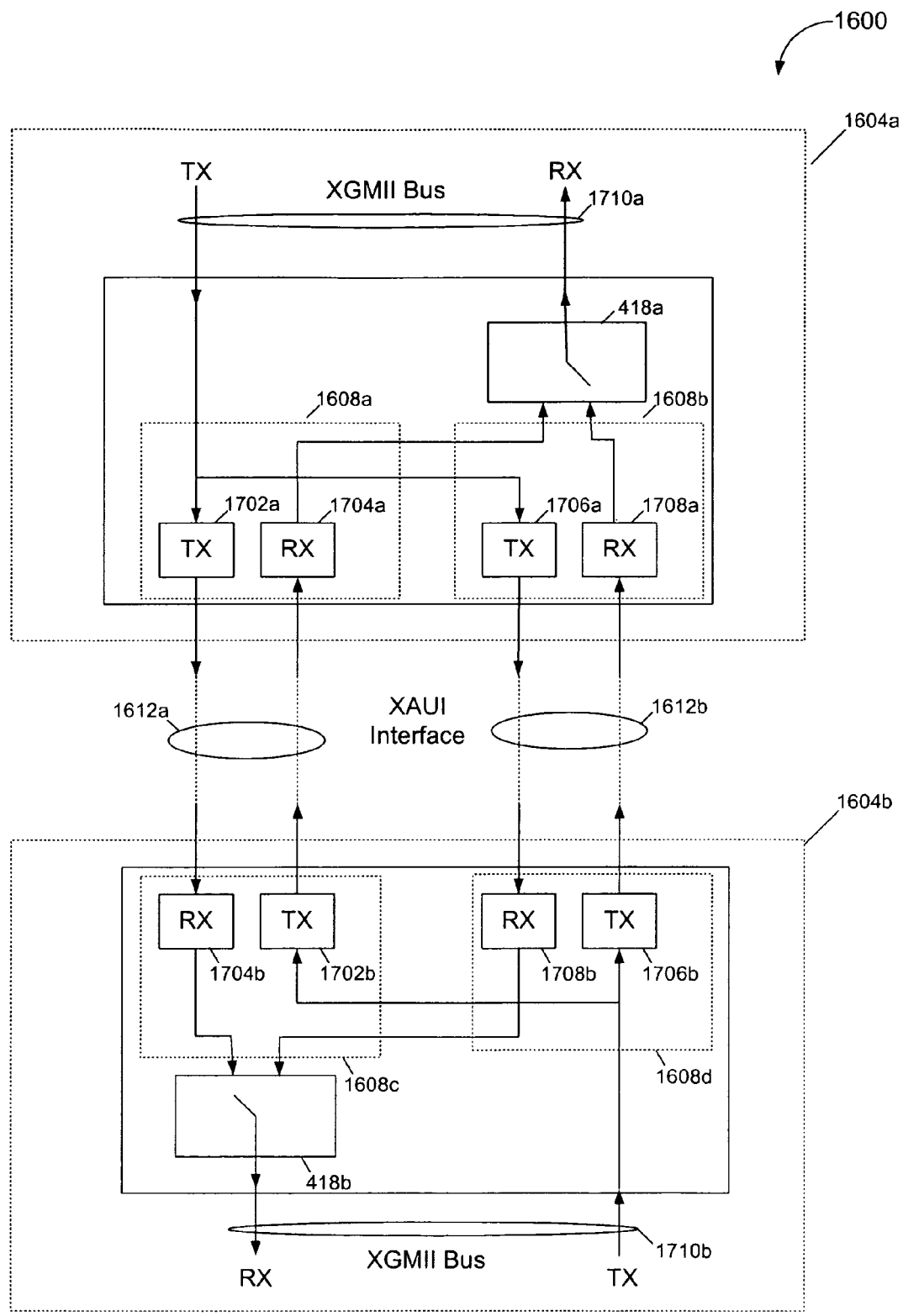
FIG. 17 illustrates the system of FIG. 16 according to another embodiment of the present invention.

FIG. 17 illustrates system 1600 according to another embodiment of the present invention. In FIG. 17, each transceiver 1604 includes configuration logic 418, transmitters 1702 and 1706, and receivers 1704 and 1708. Configuration logic 418 enables data to be passed to a XGMII bus 1710 from receiver 1704 or 1708, depending on the status of at least one of the channels 1612*a-b*. For instance, if a failure is detected with respect to channel 1612*a*, then configuration logic 418 disables receiver 1704 and enables receiver 1708. If a failure is detected with respect to channel 1612*b*, then configuration logic 418 disables receiver 1708 and enables receiver 1704.

Figure 18:
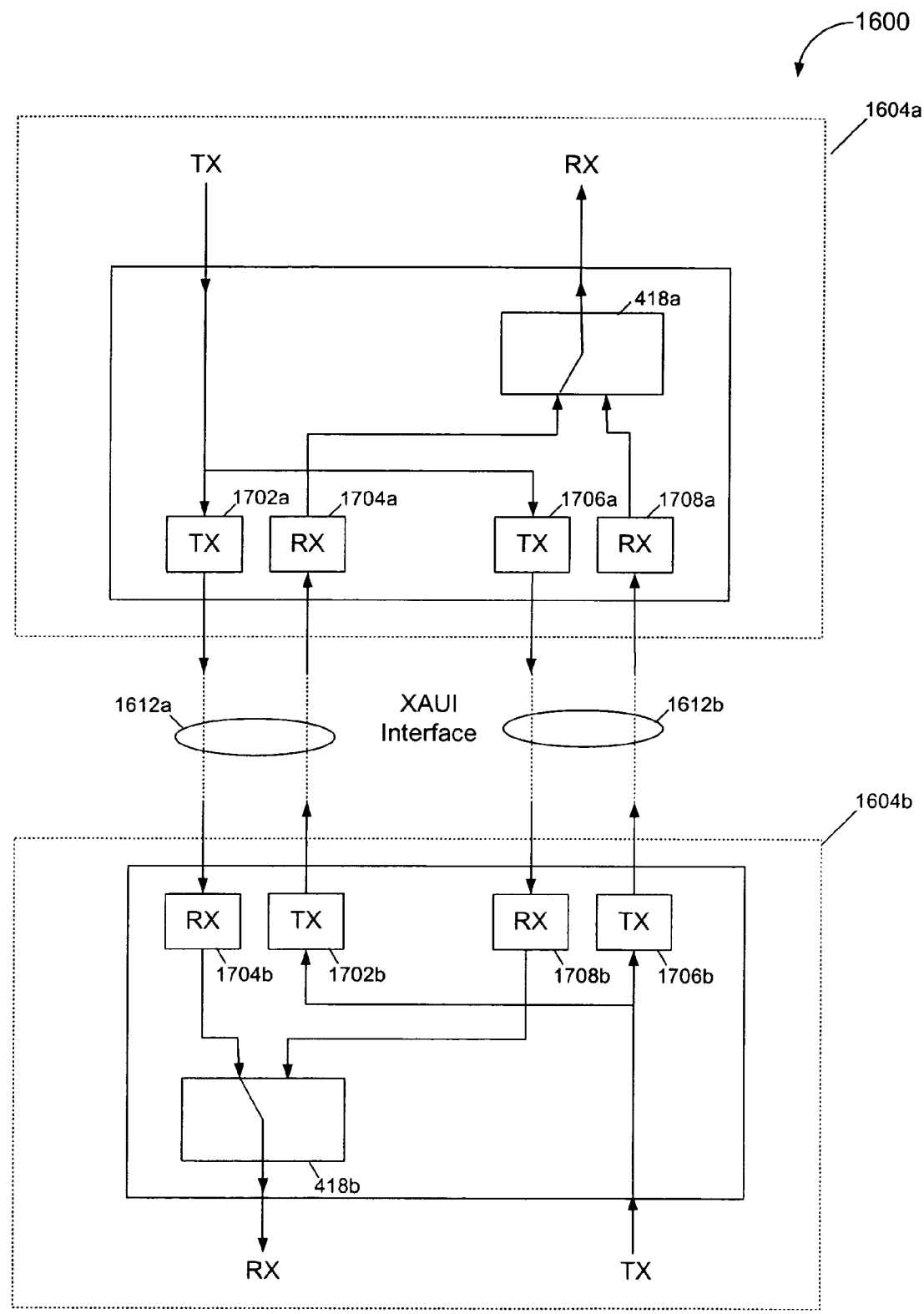
FIG. 18 illustrates the system of FIG. 17 including switches having a first configuration according to an embodiment of the present invention.

Referring to FIG. 18, configuration logic 418*a* selects receiver 1704*a*, and configuration logic 418*b* selects receiver 1704*b*. Receivers 1704*a-b* are activated, and receivers 1708*a-b* are deactivated. In the embodiment of FIG. 18, transceivers 1604*a* and 1604*b* are both configured to receive data via channel 1612*a*.

Figure 19:
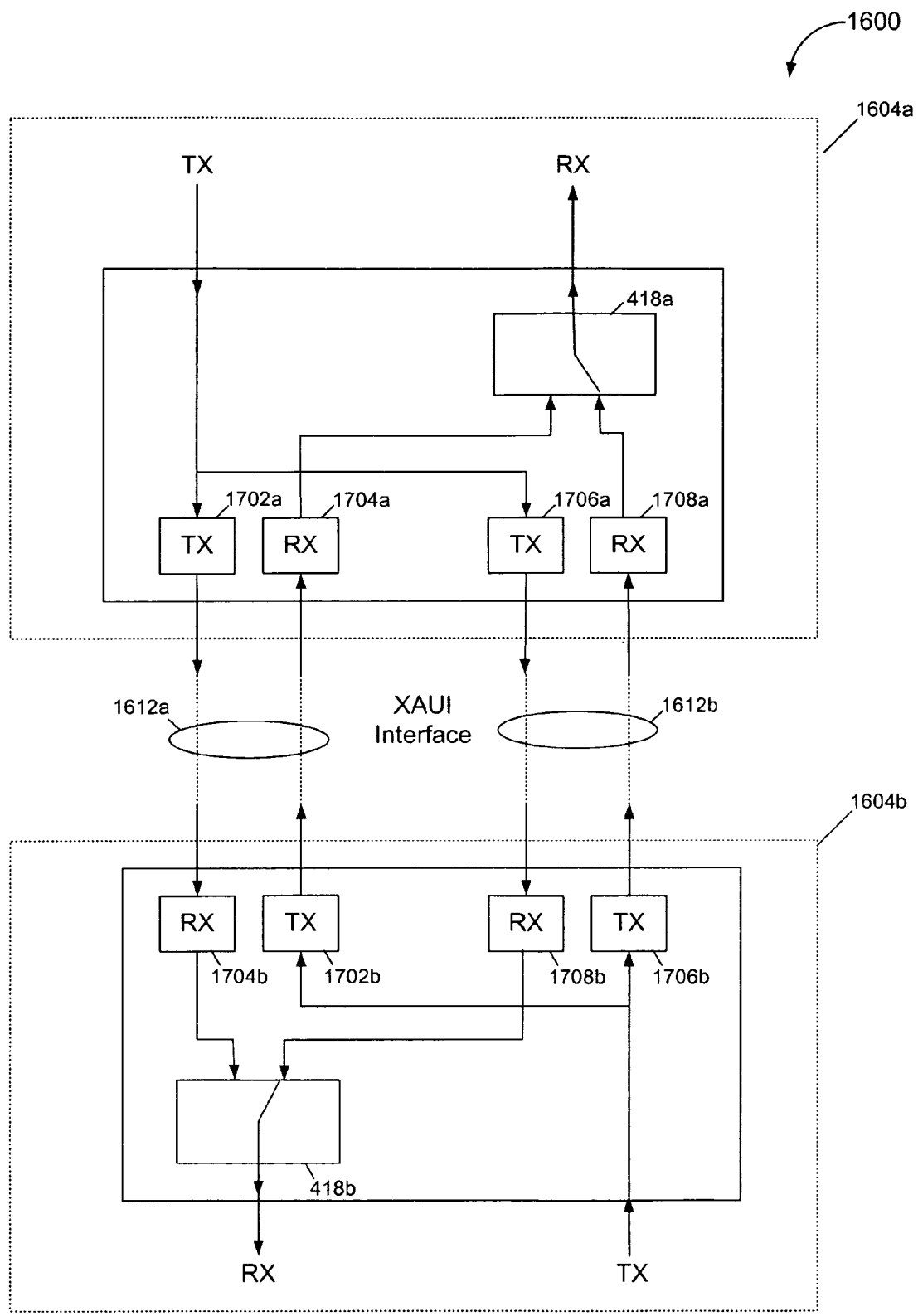
FIG. 19 illustrates the system of FIG. 17 including switches having a second configuration according to an embodiment of the present invention.

Referring to FIG. 19, configuration logic 418*a* selects receiver 1708*a*, and configuration logic 418*b* selects receiver 1708*b*. Receivers 1708*a-b* are activated, and receivers 1704*a-b* are deactivated. In the embodiment of FIG. 19, transceivers 1604*a* and 1604*b* are both configured to receive data via channel 1612*b*.

Figure 20:
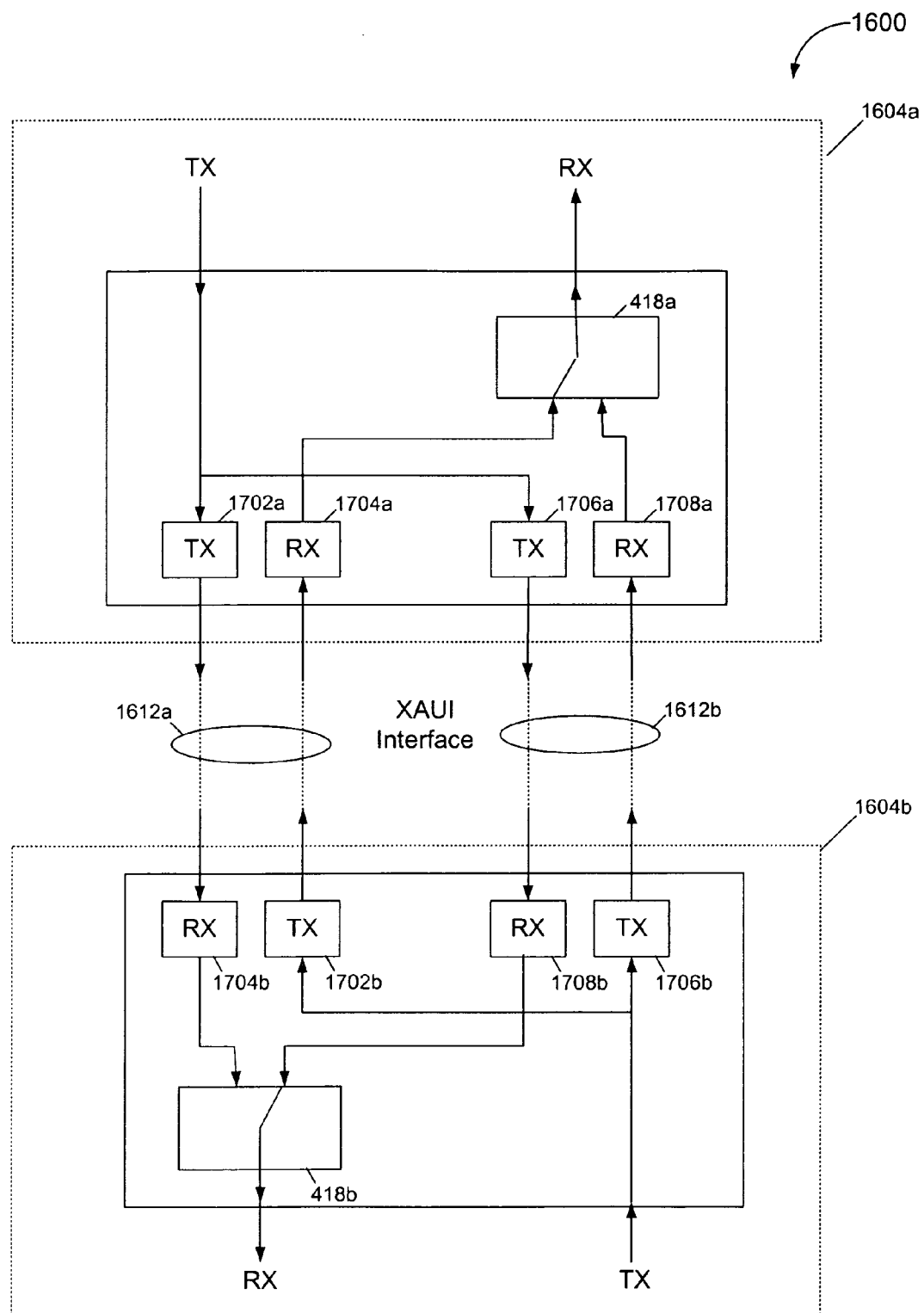
FIG. 20 illustrates the system of FIG. 17 including switches having a third configuration according to an embodiment of the present invention.

Referring to FIG. 20, configuration logic 418*a* selects receiver 1704*a*, and configuration logic 418*b* selects receiver 1708*b*. Receivers 1704*a* and 1708*b* are activated, and receivers 1704*b* and 1708*a* are deactivated. In the embodiment of FIG. 20, transceiver 1604*a* is configured to receive data via channel 1612*a*, and transceiver 1604*b* is configured to receive data via channel 1612*b*.

Figure 21:
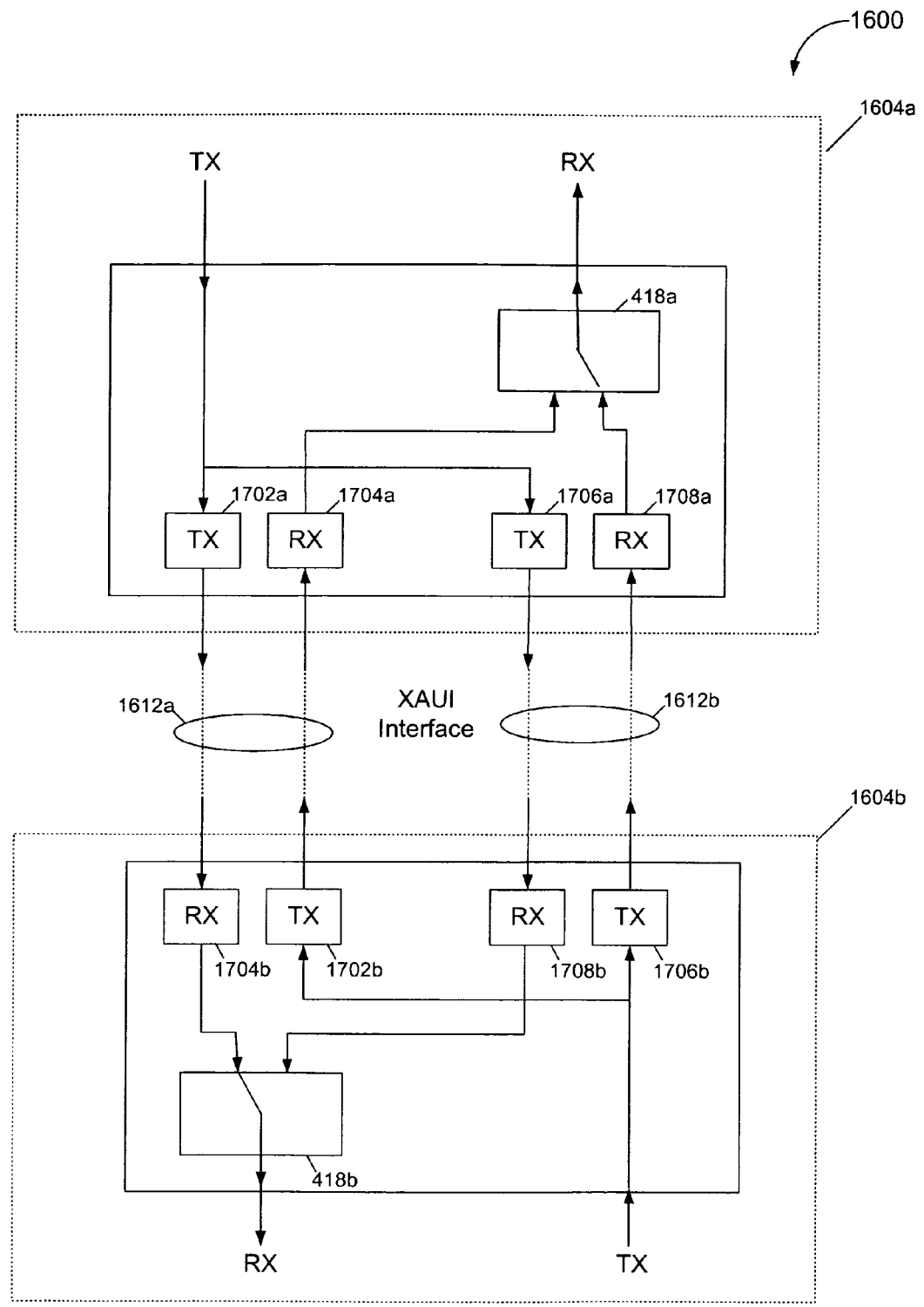
FIG. 21 illustrates the system of FIG. 17 including switches having a fourth configuration according to an embodiment of the present invention.

In FIG. 21, configuration logic 418*a* selects receiver 1708*a*, and configuration logic 418*b* selects receiver 1704*b*. Receivers 1708*a* and 1704*b* are activated, and receivers 1708*b* and 1704*a* are deactivated. In the embodiment of FIG. 21, transceiver 1604*a* is configured to receive data via channel 1612*b*, and transceiver 1604*b* is configured to receive data via channel 1612*a*.

Figure 22:
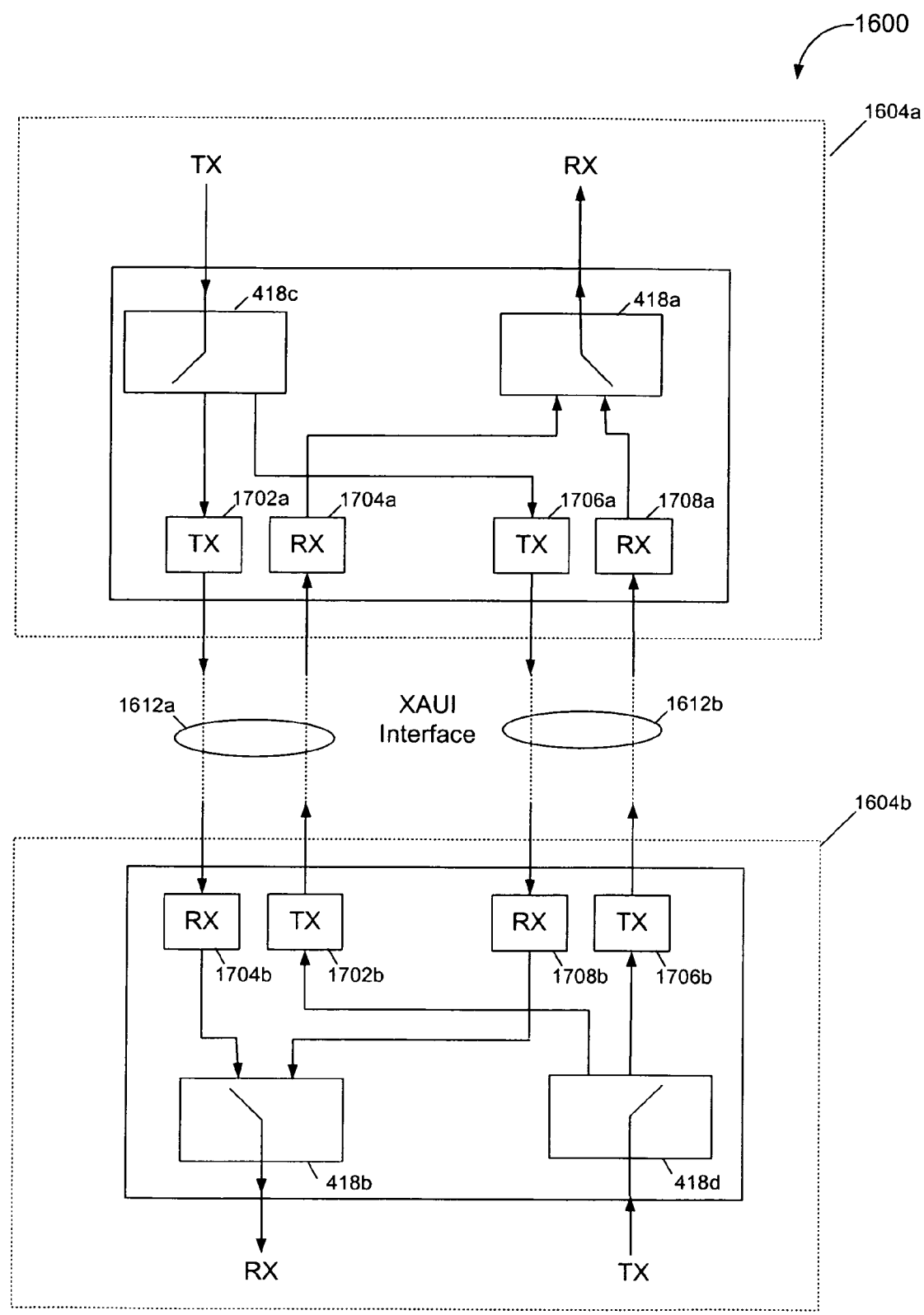
FIG. 22 illustrates the system of FIG. 16 according to yet another embodiment of the present invention.

In FIGS. 17-21, data is transmitted in parallel by transmitters 1702 and 1706 via channels 1612*a-b*, respectively. According to an embodiment, the data is immediately available upon switchover by configuration logic 418. In the embodiment of FIG. 22, configuration logic 418 further enables data to be passed from a XGMII bus 1710 to transmitter 1702 or 1706, depending on the status of at least one of the channels 1612*a-b*.

If configuration logic 418*c* detects a failure with respect to channel 1612*a*, then configuration logic 418*c* disables transmitter 1702*a* and enables transmitter 1706*a*. If configuration logic 418*d* detects a failure with respect to channel 1612*a*, then configuration logic 418*d* disables transmitter 1702*b* and enables transmitter 1706*b*. If configuration logic 418*c* detects a failure with respect to channel 1612*b*, then configuration logic 418*c* disables transmitter 1706*a* and enables transmitter 1702*a*. If configuration logic 418*d* detects a failure with respect to channel 1612*b*, then configuration logic 418*d* disables transmitter 1706*b* and enables transmitter 1702*b*.

According to an embodiment, configuration logic 418*a* or 418*b* is set based on a setting of configuration logic 418*d* or 418*c*, respectively. In another embodiment, configuration logic 418*c* or 418*d* is set based on a setting of configuration logic 418*b* or 418*a*, respectively.

Figure 23:
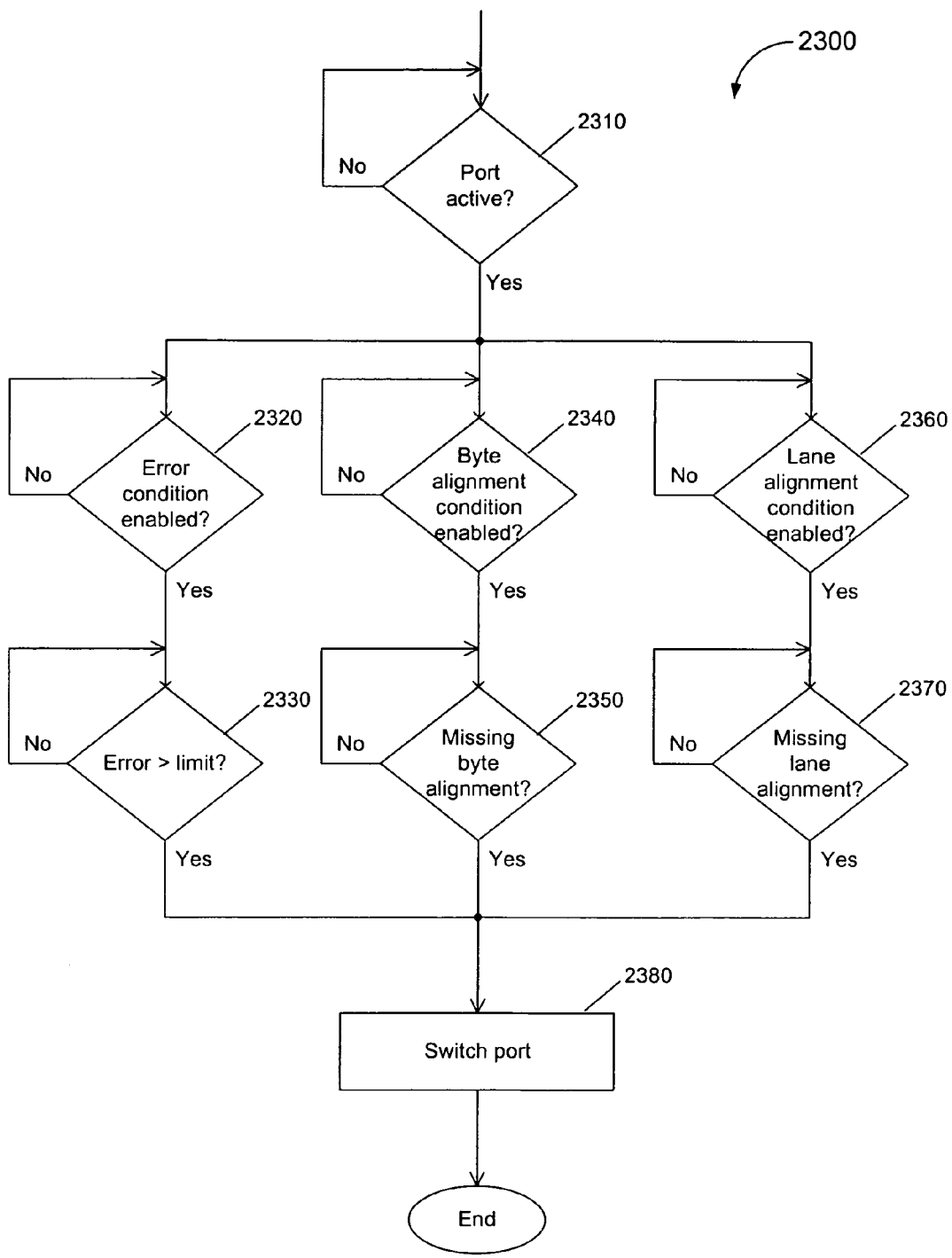
FIG. 23 is a flow chart of a method of performing automatic fail switchover according to an embodiment of the present invention.

FIG. 23 is a flow chart 2300 of a method of performing automatic fail switchover according to an embodiment of the present invention. The invention, however, is not limited to the description provided by the flowchart 2300. Rather, it will be apparent to persons skilled in the relevant art(s) from the teachings provided herein that other functional flows are within the scope and spirit of the present invention.

Flowchart 2300 will be described with continued reference to transceiver 1604 described above in reference to FIGS. 16-22, though the method is not limited to those embodiments.

Referring now to FIG. 23, configuration logic 418 in a transceiver 1604 determines whether a port 1608 of the transceiver 1604 is active, as shown in decision block 2310. According to an embodiment, the port 1608 is active if the data is being transmitted at the port 1608. In another embodiment, the port 1608 is active if the data is being received at the port 1608. If the port 1608 is not active, transceiver 1604 continues to check whether the port 1608 is active. Otherwise, configuration logic 418 determines whether certain conditions have been enabled for testing. The conditions may be predetermined, though the scope of the invention is not limited in this respect.

In the embodiment of FIG. 23, three conditions are available for testing the port 1608: an error condition, a byte alignment condition, and a lane alignment condition. However, the scope of the invention is not limited to the example conditions shown in FIG. 23. Any of a variety of conditions may be tested with respect to the port 1608. As shown in FIG. 23, the conditions may be checked/tested in parallel. In an embodiment, one or more conditions are checked/tested in series.

Referring to FIG. 23, configuration logic 418 determines whether the error condition is enabled at decision block 2320. If the error condition is not enabled, configuration logic 418 continues to check whether the error condition is enabled at decision block 2320. If the error condition is enabled, configuration logic 418 proceeds to perform the test associated with the error condition. More specifically, configuration logic 418 determines whether an error associated with the port 1608 exceeds a limit at decision block 2330. If the error does not exceed the limit, configuration logic 418 continues to check whether the error exceeds the limit at decision block 2330. If the error exceeds the limit, configuration logic 418 detects a failure associated with the port 1608 and switches from the port 1608 to another port at block 2380.

Configuration logic 418 determines whether the byte alignment condition is enabled at decision block 2340. If the byte alignment condition is not enabled, configuration logic 418 continues to check whether the byte alignment condition is enabled at decision block 2340. If the byte alignment condition is enabled, configuration logic 418 proceeds to determine whether a byte alignment is missing at decision block 2350. According to an embodiment, byte alignment is indicated by a comma character, //K//, which will be familiar to persons skilled in the art(s). The comma character is included periodically within a data stream, such as once every ten bits. If the comma character is not detected as expected within the data stream, the byte alignment is said to be missing. If the byte alignment is not missing, configuration logic 418 continues to check whether the byte alignment is missing at decision block 2350. If the error exceeds the limit, configuration logic 418 detects a failure associated with the port 1608 and switches from the port 1608 to another port at block 2380.

Configuration logic 418 determines whether the lane alignment condition is enabled at decision block 2360. If the lane alignment condition is not enabled, configuration logic 418 continues to check whether the lane alignment condition is enabled at decision block 2360. If the lane alignment condition is enabled, configuration logic 418 proceeds to determine whether a lane alignment is missing at decision block 2370. If the lane alignment is not missing, configuration logic 418 continues to check whether the lane alignment is missing at decision block 2370. If the lane alignment is missing, configuration logic 418 detects a failure associated with the port 1608 and switches from the port 1608 to another port at block 2380.

According to an embodiment, one or more conditions are programmable. For instance, different users of transceiver 1604 may have different tolerances with respect to a condition. In an embodiment, the limit described with reference to decision block 2330 is programmable, such that transceiver 1604 switches from the port 1608 to another port in response to the number of errors exceeding X, where X is programmable using software, hardware, firmware, or a combination thereof. In another embodiment, the degree of misalignment at decision block 2350 or 2370 that causes an automatic fail switchover is programmable.

In an embodiment, transceiver 1604 includes registers to store information associated with the conditions to be tested. Programmable and/or non-programmable values can be stored in the registers. For example, the registers can store information indicating whether a condition is enabled and/or satisfied.

According to an embodiment, configuration logic 418 performs the method described with reference to FIG. 23 for each port 1608 associated with configuration logic 418. For example, configuration logic 418a can perform the steps of the method with respect to each of ports 1608a and 1608a. Configuration logic 418b can perform the steps of the method with respect to each of ports 1608c and 1608d.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A transceiver, comprising:
   a first port configured to transmit and to receive data over a first plurality of parallel lanes;
   a second port configured to transmit and to receive the data, over a second plurality of parallel lanes; and
   a switch selectively coupled to the first port and the second port;
   wherein the switch is configured to activate the second port and to deactivate the first port when at least one of:
   (i) the data at a first lane from among the first plurality of parallel lanes is misaligned,
   (ii) a number of errors at a second lane from among the first plurality of parallel lanes exceeds a threshold, or
   (iii) the data at a third lane from among the first plurality of parallel lanes is misaligned with the data at other lanes from among the first plurality of parallel lanes, and
   wherein the switch is further configured to begin its determination of whether the data at the first lane is misaligned substantially simultaneously with its determination of whether the number of errors at the second lane exceeds the threshold and its determination of whether the data at the third lane is misaligned with the data at the other lanes.

2. The transceiver of claim 1, wherein the threshold is programmable.

3. The transceiver of claim 1, wherein a failure associated with the first port is indicated when the number of errors at the second lane exceeds the threshold.

4. The transceiver of claim 1, wherein the switch is configured to enable the data to be read at the second port and to disable the data from being read at the first port.

5. The transceiver of claim 1, wherein the switch is configured to enable the data to be transmitted at the second port and to disable the data from being transmitted at the first port.

6. The transceiver of claim 1, further comprising:
   a packet bit error rate tester (BERT) configured to determine the number of errors at the second lane.

7. The transceiver of claim 1, wherein the switch is configured to electrically couple a third port to the first port or the second port.

8. The transceiver of claim 7, wherein the third port is a parallel port.

9. The transceiver of claim 7, further comprising:
   a bus connecting the first port, the second port, and the third port;
   wherein the bus, the first port, the second port, and the third port are on a common substrate.

10. The transceiver of claim 9, wherein the bus is configured to have a ring shape.

11. The transceiver of claim 1, wherein the switch is configured to determine the data at the first lane is misaligned by detecting a byte alignment character in an unexpected location within the data at the first lane, the byte alignment character being periodically included within the data at one or more expected locations.

12. The transceiver of claim 11, wherein the byte alignment character comprises:
   a comma character.

13. The transceiver of claim 12, wherein the switch is configured to determine whether the data at the first lane is misaligned in parallel with determining whether the number of errors at the second lane exceeds the threshold and whether the data at the third lane is misaligned with the data at the other lanes.

14. The transceiver of claim 1, wherein at least two of the first, the second, and the third lanes are different lanes from among the first plurality of parallel lanes.

15. The transceiver of claim 1, wherein the first, the second, and the third lanes represent a single lane from among the first plurality of parallel lanes.

16. The transceiver of claim 1, wherein at least one of the first port or the second port is a serial port.

17. The transceiver of claim 1, wherein at least one of the first port or the second port is a parallel port.

18. A method of performing automatic fail switchover in a transceiver having a first port and a second port, comprising:
configuring the first port to be active;
beginning a determination of whether the data at a first lane from among a plurality of parallel lanes that are associated with the first port is misaligned substantially simultaneously with a determination of whether a number of errors at a second lane from among the plurality of parallel lanes exceeds a threshold and a determination of whether the data at a third lane from among the plurality of parallel lanes is misaligned with the data at other lanes from among the plurality of parallel lanes; and
activating the second port and deactivating the first port when the data at the first lane is misaligned, the number of errors at the second lane exceeds the threshold, or the data at the third lane is misaligned with the data at the other lanes.

19. The method of claim 18, wherein activating the second port comprises:
enabling the data to be transmitted at the second port, and wherein deactivating the first port comprises:
disabling the data from being transmitted at the first port.

20. The method of claim 18, wherein activating the second port comprises:
enabling the data to be read at the second port, and wherein deactivating the first port comprises:
disabling the data from being read at the first port.

21. The method of claim 18, wherein the step of determining whether the data at the first lane is misaligned comprises:
detecting a byte alignment character in an unexpected location within the data at the first lane, the byte alignment character being periodically included within the data at the first lane at one or more expected locations.

22. The method of claim 21, wherein the byte alignment character comprises:
a comma character.

23. The method of claim 18, wherein at least two of the first, the second, and the third lanes are different lanes from among the first plurality of parallel lanes.

24. The method of claim 18, wherein the first, the second, and the third lanes represent a single lane from among the first plurality of parallel lanes.

25. The method of claim 18, wherein at least one of the first port or the second port is a serial port.

26. The method of claim 18, wherein at least one of the first port or the second port is a parallel port.

27. The method of claim 18, further comprising:
determining whether the data at the first lane is misaligned in parallel with determining whether the number of errors at the second lane exceeds the threshold and whether the data at the third lane is misaligned with the data at the other lanes.

28. A transceiver, comprising:
a first parallel port configured to transmit and to receive data over a plurality of lanes that are associated with a communication channel; and
a switch selectively coupled to the first parallel port and to a second parallel port;
wherein the switch is configured to activate the second parallel port and to deactivate the first parallel port when at least one of:
(i) the data at a lane from among the plurality of lanes is misaligned,
(ii) a number of errors at the lane exceeds a threshold, or
(iii) the data at the lane is misaligned with the data at other lanes from among the plurality of lanes,
wherein the switch is further configured to begin its determination of whether the data at the lane is misaligned substantially simultaneously with its determination of whether the number of errors at the lane exceeds the threshold and its determination of whether the data at the lane is misaligned with the data at the other lanes.

29. The transceiver of claim 28, wherein the switch electrically couples a third parallel port to the first parallel port or the second parallel port.

30. The transceiver of claim 29, further comprising:
a bus connecting the first parallel port, the second parallel port, and the third parallel port;
wherein the bus, the first parallel port, the second parallel port, and the third parallel port are on a common substrate.

31. The transceiver of claim 28, wherein the switch, is configured to determine whether the data at the lane is misaligned in parallel with determining whether the number of errors at the lane and whether the data at the lane is misaligned with the data at the other lanes.

32. The transceiver of claim 28, wherein the switch is further configured to begin its determination of whether the data at the lane is misaligned substantially simultaneously with its determination of whether the number of errors at the lane exceeds the threshold and its determination of whether the data at the lane is misaligned with the data at the other lanes.

33. The transceiver of claim 28, wherein at least two of the first, the second, and the third lanes are different lanes from among the plurality of lanes.

34. The transceiver of claim 28, wherein the first, the second, and the third lanes represent a single lane from among the plurality of lanes.

* * * * *

UNITED STATES PATENT AND TRADEMARK OFFICE
CERTIFICATE OF CORRECTION

PATENT NO. : 8,385,188 B2  
APPLICATION NO. : 11/117470  
DATED : February 26, 2013  
INVENTOR(S) : Hoang Tran Page 1 of 1

It is certified that error appears in the above-identified patent and that said Letters Patent is hereby corrected as shown below:

In the Specifications:

Column 16, line 37, please replace "switch," with --switch--.

Signed and Sealed this  
Twenty-third Day of April, 2013

Teresa Stanek Rea  
*Acting Director of the United States Patent and Trademark Office*